US012604898B2

(12) United States Patent
Sasaki et al.

(10) Patent No.: US 12,604,898 B2
(45) Date of Patent: Apr. 21, 2026

(54) DISILVER HYDROGEN CITRATE-CONTAINING COMPOSITION, METHOD FOR PRODUCING SAME, ANTIBACTERIAL AGENT OR ANTIVIRAL AGENT USING SAME, AND METHOD FOR PRODUCING SAME

(71) Applicant: SASAKI CHEMICAL INDUSTRY CO., LTD., Tokyo (JP)

(72) Inventors: Tomihisa Sasaki, Tokyo (JP); Takamasa Sasaki, Tokyo (JP); Yoshinori Sasaki, Tokyo (JP)

(73) Assignee: SASAKI CHEMICAL INDUSTRY CO., LTD., Tokyo (JP)

( * ) Notice: Subject to any disclaimer, the term of this patent is extended or adjusted under 35 U.S.C. 154(b) by 733 days.

(21) Appl. No.: 17/799,059

(22) PCT Filed: Jun. 22, 2021

(86) PCT No.: PCT/JP2021/023513

§ 371 (c)(1),
(2) Date: Aug. 11, 2022

(87) PCT Pub. No.: WO2021/261467

PCT Pub. Date: Dec. 30, 2021

(65) Prior Publication Data

US 2023/0089450 A1 Mar. 23, 2023

(30) Foreign Application Priority Data

Jun. 23, 2020 (JP) ................................. 2020-107646
Apr. 16, 2021 (JP) ................................. 2021-069504

(51) Int. Cl.
*A01N 59/16* (2006.01)
*A01P 1/00* (2006.01)

(52) U.S. Cl.
CPC ................ *A01N 59/16* (2013.01); *A01P 1/00* (2021.08)

(58) Field of Classification Search
None
See application file for complete search history.

(56) References Cited

U.S. PATENT DOCUMENTS

2005/0202066 A1 9/2005 Arata et al.
2010/0040699 A1 2/2010 Djokic
2014/0329899 A1 11/2014 Nakamura et al.

FOREIGN PATENT DOCUMENTS

CN 109014244 A 12/2018
WO WO-2017043359 A1 * 3/2017
WO 2020162485 A1 8/2020

OTHER PUBLICATIONS

Kamali et al. Iranian Journal of Chemistry and Chemical Engineering 2012 31(4):21-28 (Year: 2012).*
Zarkadas et al., "Influence of citric acid on the silver electrodeposition from aqueous AgNO3 solutions," Electrochimica Acta, vol. 50, 2005, pp. 5022-5031.
International Search Report and Written Opinion, International Application No. PCT/JP2021/023513; dated Aug. 24, 2021.
Djokić et al., "Synthesis and Antimicrobial Activity of Silver Citrate Complexes," Bioinorganic Chemistry and Applications, vol. 2008, Article ID 436458, pp. 1-8, 2008.
Extended European Search Report of EP Application No. 21829604.4, dated May 28, 2024.

* cited by examiner

*Primary Examiner* — Robert A Wax
*Assistant Examiner* — Caralynne E Helm
(74) *Attorney, Agent, or Firm* — ArentFox Schiff LLP; Daniel W. Clarke

(57) ABSTRACT

Provided are powder of a pure disilver hydrogen citrate-containing composition in powder form, having excellent solubility, and a method for easily obtaining the disilver hydrogen citrate-containing composition with high efficiency. In addition, provided are an antibacterial agent or antiviral agent, containing the disilver hydrogen citrate-containing composition, and a method for producing the same.

The method for producing a disilver hydrogen citrate-containing composition of the present invention includes the following processes (1) to (3):

(1) preparing a reaction mixture containing a silver compound and citric acid, the reaction mixture having a pH of 2.0 to 5.5;
(2) precipitating the disilver hydrogen citrate-containing composition from the reaction mixture; and
(3) collecting the precipitated disilver hydrogen citrate-containing composition.

2 Claims, 2 Drawing Sheets

[FIG. 1]
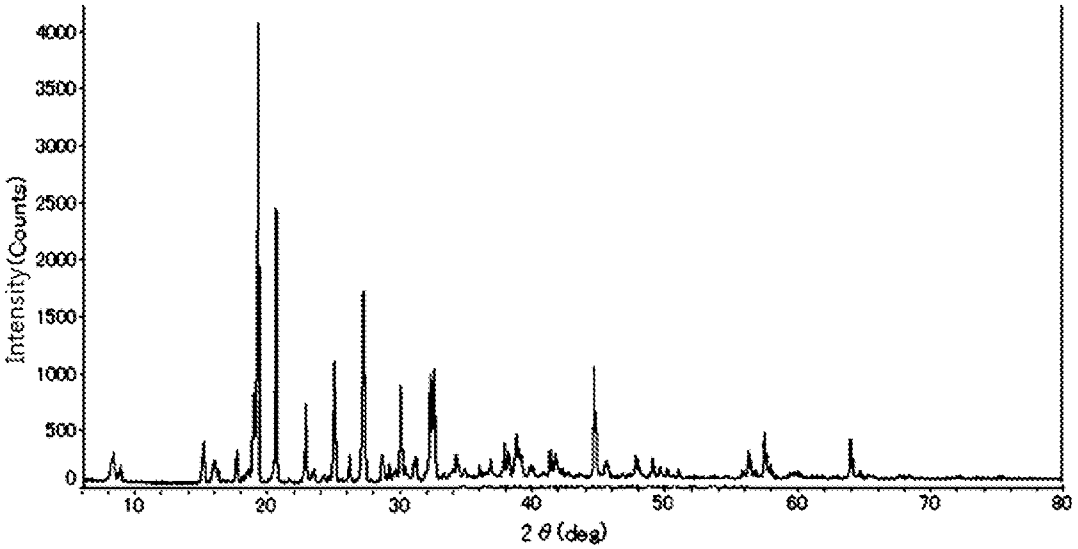
[FIG. 2]
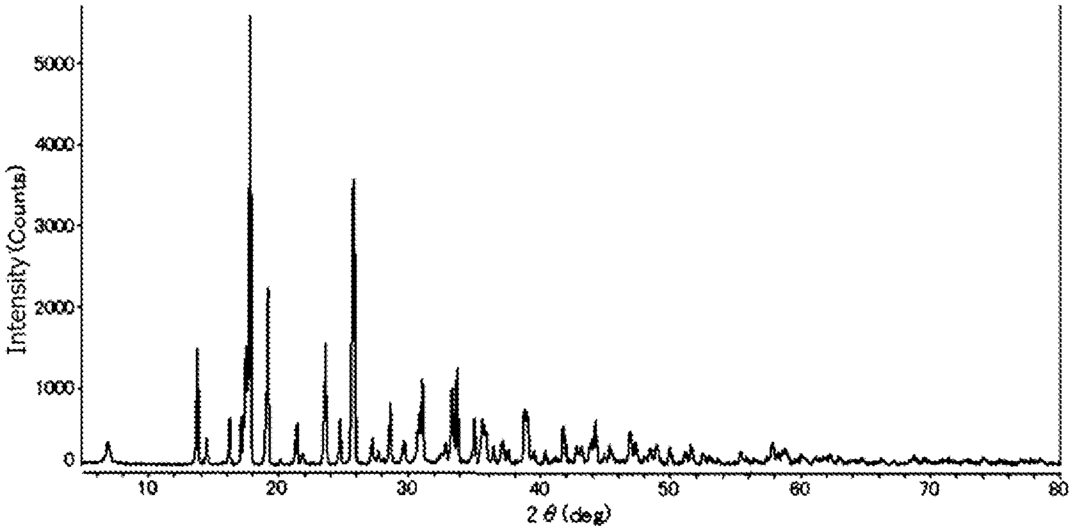

[FIG. 3]
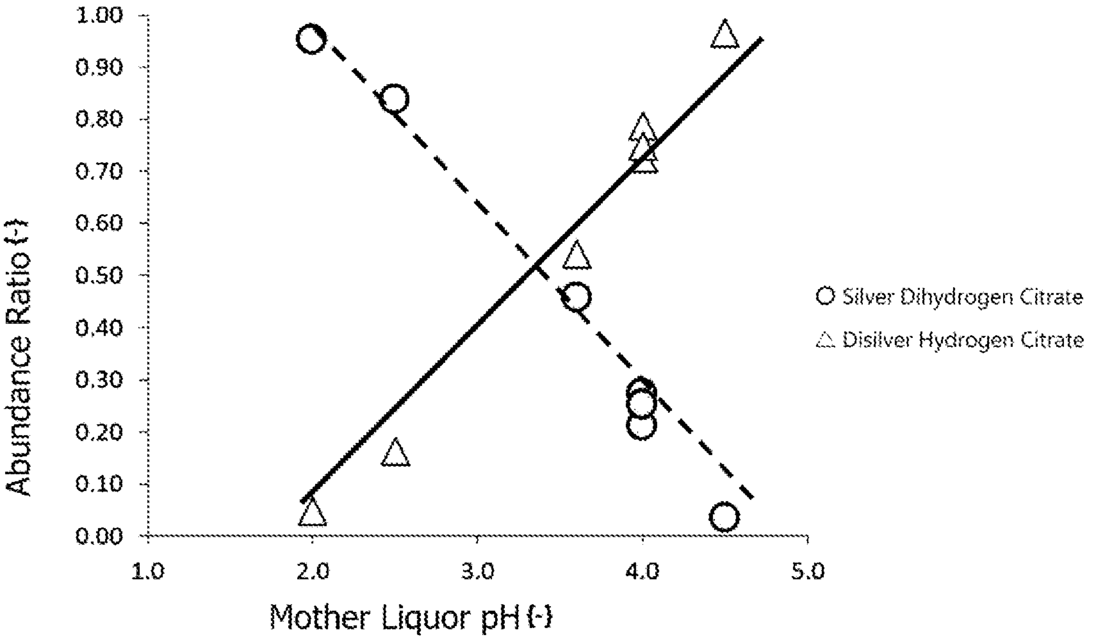
FIG. 4
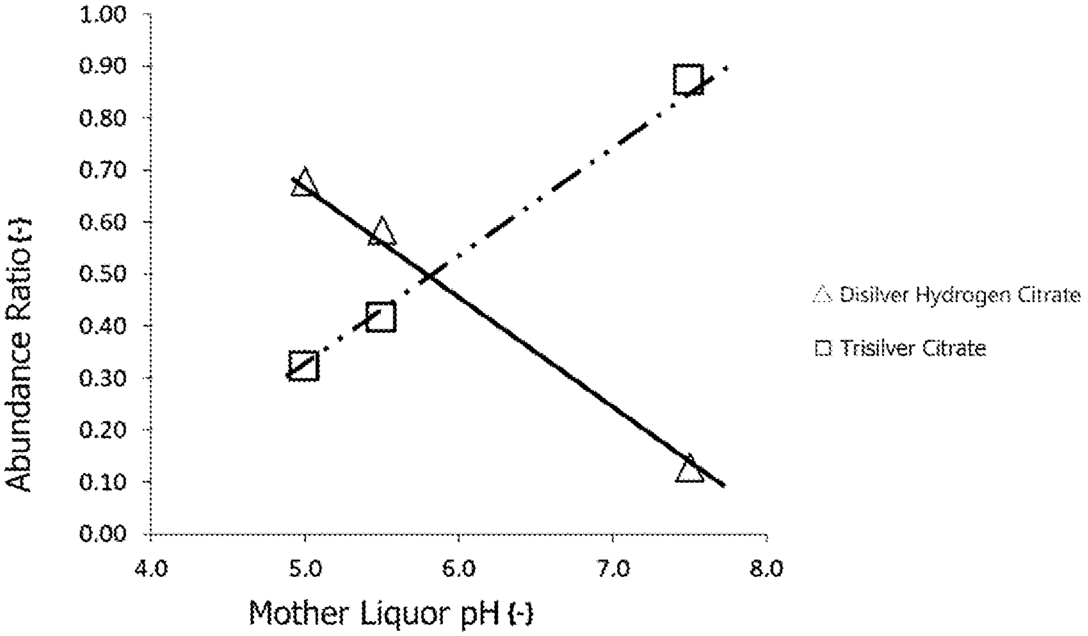

DISILVER HYDROGEN CITRATE-CONTAINING COMPOSITION, METHOD FOR PRODUCING SAME, ANTIBACTERIAL AGENT OR ANTIVIRAL AGENT USING SAME, AND METHOD FOR PRODUCING SAME

RELATED APPLICATIONS

This application is a national stage application, filed under 35 U.S.C. § 371, of International Application No. PCT/JP2021/023513, filed Jun. 22, 2021, which claims the benefit of priority under 35 U.S.C. § 119 to JP Application No. 2020-107646, filed on Jun. 23, 2020, and JP Application No. 2021-069504, filed on Apr. 16, 2021, each of which is incorporated herein by reference in its entirety.

TECHNICAL FIELD

The present invention relates to a disilver hydrogen citrate-containing composition and a method for producing the same, as well as an antibacterial agent or antiviral agent using the same and a method for producing the same.

BACKGROUND ART

In recent years, awareness of hygiene, in particular, awareness of preventive measures against infectious diseases has increased, and demands for antibacterial and antiviral properties of human body surfaces and personal articles have increased. Organic antibacterial agents such as triclosan, zinc pyrithione, and quaternary ammonium are conventionally known as substances having antibacterial properties. Although an organic antibacterial agent exhibits strong bactericidal properties in a short time, it may be undesirable because it causes a skin allergy of a human body or causes hormonal disturbance to organisms in the environment. In addition, the organic antibacterial agent is characterized by having a high bactericidal effect and a narrow antibacterial spectrum at the same time. Therefore, a compound of silver has attracted attention in recent years as an alternative material.

For example, silver citrate is known as such a compound of silver. Silver citrate has been attracting particular attention in recent years because it has both a fast-acting properties as an organic bactericide has, and safety and long-lasting properties as an inorganic silver antibacterial agent has. As a method for producing a solution containing silver citrate, for example, a method for performing electrolysis in a citric acid aqueous solution using silver electrodes (Patent Literature 1), a method for using trisilver citrate (Patent Literature 2), a method for dissolving silver zeolite in a citric acid solution (Patent Literature 3), and the like are known.

CITATION LIST

Patent Literature

Patent Literature 1: JP 2007-504157 A
Patent Literature 2: JP 2011-530542 A
Patent Literature 3: JP 2013-53085 A

SUMMARY OF INVENTION

Technical Problem

However, the method described in Patent Literature 1 takes as long as 144 hours to obtain a silver dihydrogen citrate solution having a silver ion concentration of 2400 ppm, has the poor production efficiency, and requires an expensive high-purity silver electrode, whereby the production cost increases. The method described in Patent Literature 2 deteriorates workability because the method uses trisilver citrate having poor solubility (solubility at 25° C.: 0.0284 g/L, silver concentration: 170 ppm), and it is difficult to obtain a solution having a high silver ion concentration. In the method described in Patent Literature 3, silica or aluminum, which is a skeleton component derived from zeolite, may be mixed as impurities. Thus, it is difficult to obtain pure silver citrate, and in the case of removing such impurities, the number of processes increases and the production cost increases.

Therefore, an object of the present invention is to provide a novel pure disilver hydrogen citrate-containing composition in powder form, having excellent solubility, and a method for producing the same. Another object of the present invention is to provide an antibacterial agent or an antiviral agent, containing the disilver hydrogen citrate-containing composition, and a method for producing the same.

Solution to Problem

As a result of intensive studies, the present inventors have found that the above-described object can be achieved by preparing an aqueous solution to which a silver compound, and citric acid or a salt thereof are added in such amounts that the disilver hydrogen citrate to be generated is in a saturated amount or more, and adopting a method for precipitating a target product from this solution, and have completed the present invention.

That is, the present invention includes the following aspects.

[1]

A method for producing a disilver hydrogen citrate-containing composition, the method including processes (1) to (3) below:

(1) preparing a reaction mixture containing a silver compound and citric acid with pH 2.0 to 5.5;

(2) precipitating the disilver hydrogen citrate-containing composition from the reaction mixture; and (3) collecting the precipitated disilver hydrogen citrate-containing composition.

[2]

The method for producing a disilver hydrogen citrate-containing composition according to [1], wherein the disilver hydrogen citrate-containing composition further comprises silver dihydrogen citrate or trisilver citrate, and has 36.1 wt % to 63.1 wt % of silver concentration.

[3]

The method for producing a disilver hydrogen citrate-containing composition according to [1] or [2], wherein the silver compound is silver nitrate.

[4]

The method for producing a disilver hydrogen citrate-containing composition according to any one of [1] to [3], in which the process (1) is a process of adding the silver compound and metal citrate to a citrate buffer solution with pH 2.0 to 5.5.

[5]

The method for producing a disilver hydrogen citrate-containing composition according to [4], further including, subsequent to the processes (1) to (3), a process (4):

(4) further adding a silver compound and metal citrate to the reaction mixture to collect the precipitated disilver hydrogen citrate-containing composition.

[6]

The method for producing a disilver hydrogen citrate-containing composition according to any one of [1] to [3], wherein the process (1) is a process of adding the silver compound and the citric acid to water to make the reaction mixture, and further adding a pH adjuster to the reaction mixture to adjust into pH 2.0 to 5.5.

[7]

The method for producing a disilver hydrogen citrate-containing composition according to [6], further including, subsequent to the processes (1) to (3), a process (4):

(4) further adding a silver compound and citric acid to the reaction mixture and adjusting into pH 2.0 to 5.5 by adding pH adjuster, to collect the precipitated disilver hydrogen citrate-containing composition.

[8]

A method for producing an antibacterial agent or an antiviral agent, including by the method for producing a disilver hydrogen citrate-containing composition according to any one of [1] to [7], producing the disilver hydrogen citrate-containing composition, and mixing the obtained disilver hydrogen citrate-containing composition with water or a citric acid solution.

[9]

A composition comprising disilver hydrogen citrate and silver dihydrogen citrate, or disilver hydrogen citrate and trisilver citrate, in which the composition has 36.1 wt % or more and 63.1 wt % or less of a silver concentration.

[10]

A composition comprising disilver hydrogen citrate and silver dihydrogen citrate, wherein the composition has 36.1 wt % or more and 53.2 wt % or less of a silver concentration.

[11]

An antibacterial agent or an antiviral agent, comprising the composition according to [9] or [10].

The present invention also includes the following aspects.

[1] A method for producing disilver hydrogen citrate and/or silver dihydrogen citrate, comprising:

(1) preparing a citrate buffer solution with pH 2.5 to 5.5;

(2) adding, to the citrate buffer solution, a silver compound and metal citrate in such amounts that the disilver hydrogen citrate and/or the silver dihydrogen citrate to be generated are in saturated amounts or more; and (3) collecting the precipitated disilver hydrogen citrate and/or the silver dihydrogen citrate.

[2] The method for producing disilver hydrogen citrate and/or silver dihydrogen citrate according to [1], wherein the disilver hydrogen citrate and/or the silver dihydrogen citrate is a mixture of the disilver hydrogen citrate and the silver dihydrogen citrate, and a mole ratio of the disilver hydrogen citrate to the silver dihydrogen citrate is 1:4 to 1:6.

[3] The method for producing disilver hydrogen citrate and/or silver dihydrogen citrate according to [1] or [2], wherein the silver compound is silver nitrate.

[4] The method for producing disilver hydrogen citrate and/or silver dihydrogen citrate according to any one of [1] to [3], further including, subsequent to the process (3):

(4) adding a silver compound and metal citrate again to a mother liquor, to collect the precipitated disilver hydrogen citrate and/or silver dihydrogen citrate.

[5] A method for producing an antibacterial or antiviral solution, comprising mixing, with water or a citrate buffer solution, the disilver hydrogen citrate and/or the silver dihydrogen citrate obtained by the method for producing silver hydrogen citrate and/or silver dihydrogen citrate according to any one of [1] to [4].

[6] Mixed powder comprising disilver hydrogen citrate and silver dihydrogen citrate, wherein the mixed powder has 1:4 to 1:6 of a mole ratio of the disilver hydrogen citrate to the silver dihydrogen citrate.

Advantageous Effects of Invention

According to the production method of the present invention, a pure disilver hydrogen citrate-containing composition having excellent solubility can be easily obtained with high efficiency. In addition, by using the production method of the present invention, even when trisilver citrate with poor workability is mixed into disilver hydrogen citrate, the composition can be obtained by filtering operation.

Since the disilver hydrogen citrate-containing composition of the present invention has a wide antibacterial spectrum and further has virus inactivation activity, the composition can be used as an antibacterial agent or an antiviral agent for pharmaceutical products, quasi-pharmaceutical products, oral care agents, disinfectants, cleaning agents, cosmetics, health care products, bactericides, antifungal agents, antiseptics, deodorants, surface treatment agents, hygiene maintenance in various processes, food freshness-keeping agents, food packaging materials, cloths, clothing, and bedding including fibers, keeping freshness of agricultural products and the like, sanitary members, agricultural materials, substitution of agricultural chemicals, prevention of livestock communicable diseases, car industry, and the like. In addition, for example, by using the powder of the novel disilver hydrogen citrate-containing composition of the present invention as deodorant, due to having an oxidizing power derived from silver, the disilver hydrogen citrate-containing composition can react with a component such as sulfur-based gas, amine-based gas, aldehyde-based gas, propionic acid, and isovaleric acid that causes malodor and deodorize it, and can exhibit an effect as deodorant.

BRIEF DESCRIPTION OF DRAWINGS

FIG. 1 shows a graph indicating an XRD spectrum of disilver hydrogen citrate and/or silver dihydrogen citrate obtained by a method of the present invention.

FIG. 2 shows a graph indicating an XRD spectrum of disilver hydrogen citrate and/or silver dihydrogen citrate contained in a commercially available silver citrate aqueous solution.

FIG. 3 shows a graph indicating a molar abundance ratio of the precipitated disilver hydrogen citrate and silver dihydrogen citrate corresponding to the pH value of each reaction mixture obtained by the method of the present invention.

FIG. 4 shows a graph indicating a molar abundance ratio of the precipitated disilver hydrogen citrate and trisilver citrate corresponding to the pH value of each reaction mixture obtained by the method of the present invention.

DESCRIPTION OF EMBODIMENTS

In the present invention, the "disilver hydrogen citrate-containing composition" refers to a composition containing at least disilver hydrogen citrate, preferably a composition containing disilver hydrogen citrate and silver dihydrogen citrate, or disilver hydrogen citrate and trisilver citrate, and may be represented as disilver hydrogen citrate and silver dihydrogen citrate, or disilver hydrogen citrate and trisilver citrate obtained by the production method of the present invention. To redissolve the powder of the disilver hydrogen citrate-containing composition in citric acid or the like, the composition is preferably a composition containing disilver hydrogen citrate and silver dihydrogen citrate.

In one aspect of the present invention, the mole ratio of the disilver hydrogen citrate to the silver dihydrogen citrate is preferably 1:4 to 1:6 mol, and more preferably 1:4.5 to 1:5.5. In another aspect, the content of silver contained in the disilver hydrogen citrate-containing composition is preferably 36.1 wt % to 63.1 wt %, and more preferably 36.1 wt % to 53.2 wt %.

That is, the solubility in water or a citric acid solution of silver dihydrogen citrate is higher than that of disilver hydrogen citrate, and that of disilver hydrogen citrate is higher than that of trisilver citrate. Therefore, from the viewpoint of preparing an antibacterial agent or an antiviral agent, it is more desirable that silver dihydrogen citrate is contained in a ratio of 25% or more of the disilver hydrogen citrate-containing composition. The mole ratio of the disilver hydrogen citrate to the silver dihydrogen citrate and of the trisilver citrate to the silver dihydrogen citrate can be calculated from the weight of the silver citrate powder obtained by drying treatment and the silver concentration obtained by taking out a part of the silver citrate powder, dissolving it in a nitric acid solution, and measuring the silver concentration by high frequency inductively coupled plasma (ICP) emission spectrometry.

The disilver hydrogen citrate-containing composition of the present invention is preferably a composition substantially free of citric acid, and more preferably, substantially consisting only of silver dihydrogen citrate, disilver hydrogen citrate, and/or trisilver citrate.

As used herein, the "final pH of a(the) mother liquor" or the "final pH" refers to the pH of the aqueous solution in the process of precipitating the disilver hydrogen citrate-containing composition. To control the proportion of the disilver hydrogen citrate in the disilver hydrogen citrate-containing composition, preferred is a method for adjusting the final pH of the mother liquor from pH 2.0 to pH 5.5.

According to one aspect of the present invention, the disilver hydrogen citrate-containing composition of the present invention contains disilver hydrogen citrate and silver dihydrogen citrate, and a mixed powder in which the mole ratio of the disilver hydrogen citrate to the silver dihydrogen citrate is 1:4 to 1:6 mol can be easily obtained. In another aspect, the disilver hydrogen citrate-containing composition of the present invention contains disilver hydrogen citrate and silver dihydrogen citrate, or disilver hydrogen citrate and trisilver citrate, and powder of the disilver hydrogen citrate-containing composition in which a content of silver contained in the disilver hydrogen citrate-containing composition containing disilver hydrogen citrate and silver dihydrogen citrate, or disilver hydrogen citrate and trisilver citrate is 36.1 wt % or more and less than 63.1 wt % can be easily obtained.

As used herein, the "silver citrate" refers to a compound selected from the group consisting of silver dihydrogen citrate, disilver hydrogen citrate, trisilver citrate, and combinations thereof.

The silver citrate can be represented by the following structural formula. Silver dihydrogen citrate means a silver citrate compound in which x is 2 and y is 1. Disilver hydrogen citrate means a silver citrate compound in which x is 1 and y is 2. Trisilver citrate means a silver citrate compound in which x is 0 and y is 3.

Structural Formula of Silver Citrate

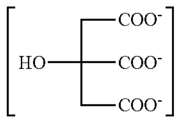

$xH^+yAg^+$ $x + y = 3$

The method for producing a disilver hydrogen citrate-containing composition of the present invention is a method for producing a disilver hydrogen citrate-containing composition by first preparing an aqueous solution to which a silver compound and citric acid are added in such amounts that the disilver hydrogen citrate-containing composition to be generated is in a saturated amount or more, and precipitating a disilver hydrogen citrate-containing composition in an amount of the saturated amount or more from the aqueous solution at a desired pH.

Examples of the method for precipitating the disilver hydrogen citrate-containing composition at a desired pH include (1) a method for precipitating the disilver hydrogen citrate-containing composition that is in a saturated amount or more by preparing an aqueous solution obtained by adding a silver compound and citric acid to a citrate buffer solution adjusted to a desired pH in advance, and by further adding citric acid or metal citrate, and (2) a method for precipitating a disilver hydrogen citrate-containing composition by preparing an aqueous solution obtained by adding a silver compound and citric acid in such amounts that the disilver hydrogen citrate-containing composition is in a saturated amount or more, and adding a pH adjuster to the aqueous solution to adjust the pH to a desired pH.

The "citric acid" of the present invention may be anhydride or hydrate, and is preferably hydrate from the viewpoint of solubility.

The "silver compound" of the present invention is not particularly limited, for example silver nitrate and silver sulfate, and preferably silver nitrate from the viewpoint of efficiently generating a disilver hydrogen citrate-containing composition.

The "desired pH" of the present invention is not particularly limited as long as it is a pH at which the disilver hydrogen citrate-containing composition can precipitate, preferably pH 2.0 to 5.5, and more preferably pH 2.5 to 5.5, pH 3.0 to 5.0, or pH 3.5 to 4.5.

The "citric acid solution" into which the disilver hydrogen citrate-containing composition of the present invention is dissolved refers to an aqueous solution containing citric acid. The concentration of citric acid is not particularly limited, but preferred is a citric acid solution of 1 wt % to 10 wt %, and more preferred is a citric acid solution of 5 wt % to 7 wt %. In addition, the citric acid solution may be a citrate buffer solution further containing metal citrate. The citrate buffer solution is preferably a citrate buffer solution containing citric acid and sodium citrate and having a pH of 2.5 to 5.5.

The collected disilver hydrogen citrate-containing composition is preferably lightly washed with water and then dried under normal pressure or in vacuo. A disilver hydrogen citrate-containing composition can be obtained in powder form by drying. From the viewpoint of preventing the decomposition of the obtained disilver hydrogen citrate-containing composition, the drying temperature is preferably 60° C. or lower, and more preferably 50° C. or lower. The above drying may be freeze drying.

In the present invention, it is preferable to reuse a mother liquor from which a disilver hydrogen citrate-containing composition has been collected. That is, the above used mother liquor allows the precipitation of the disilver hydrogen citrate-containing composition by adding the silver compound and citric acid again, and thus a disilver hydrogen citrate-containing composition having the same quality can be obtained through the same operation. Nitrate (for example, sodium nitrate) is generated in the mother liquor each time the disilver hydrogen citrate-containing composition is produced according to the production method of the present invention, but nitrate has a very high solubility in water and therefore do not affect the reaction. The method for producing a disilver hydrogen citrate-containing composition of the present invention is thus excellent in mass productivity.

A first aspect of the present invention is a method for precipitating the disilver hydrogen citrate-containing composition that is in a saturated amount or more by preparing an aqueous solution obtained by adding a silver compound and citric acid to a citrate buffer solution adjusted to a desired pH in advance, and by further adding citric acid or metal citrate. That is, the present invention is a method for producing a disilver hydrogen citrate-containing composition by preparing an aqueous solution in which, to a citrate buffer solution having a specific pH, a silver compound and metal citrate are added in such amounts that the disilver hydrogen citrate-containing composition to be generated is in a saturated amount or more, and adopting a method for precipitating a target product from this solution.

In the method for producing a disilver hydrogen citrate-containing composition according to the first aspect, first, a citrate buffer solution is prepared.

The method for preparing the citrate buffer solution is not particularly limited. For example, the citrate buffer solution can be obtained by dissolving a predetermined amount of trisodium citrate or tripotassium citrate in pure water or ion-exchanged water, and then adding and dissolving a predetermined amount of citric acid. The pH of the citrate buffer solution is adjusted to a range of 2.5 to 5.5. By adjusting the pH of the citrate buffer solution within the above-described range, powder of the disilver hydrogen citrate-containing composition having excellent solubility can be efficiently obtained. From the viewpoint of increasing the yield of the disilver hydrogen citrate-containing composition and efficiently collecting the disilver hydrogen citrate-containing composition, the above-described pH is more preferably 3.0 to 5.0, and still more preferably 3.5 to 4.5.

The citric acid and the trisodium citrate or the tripotassium citrate described above are preferably hydrates from the viewpoint of solubility.

Next, to the obtained citrate buffer solution, a silver compound and metal citrate are added in amounts by which the disilver hydrogen citrate-containing composition to be generated is in a saturated amount or more. In this process, (1) to the citrate buffer solution, the silver compound and the metal citrate may be added at a time in amounts by which the disilver hydrogen citrate-containing composition to be generated is in a saturated amount or more, or (2) the silver compound and the metal citrate may be added to the citrate buffer solution to prepare a saturated aqueous solution of disilver hydrogen citrate and/or silver dihydrogen citrate, and then the silver compound and the metal citrate may be further added to the citrate buffer solution to obtain an aqueous solution in a supersaturated state. The silver compound is not particularly limited, and examples thereof include silver nitrate and silver sulfate, but preferred is silver nitrate from the viewpoint of efficiently generating a disilver hydrogen citrate-containing composition.

In addition, publicly known metal citrate can be appropriately used as the above-described metal citrate according to the desired composition of the disilver hydrogen citrate-containing composition. The above-described metal citrate is preferably a monovalent and/or divalent metal salt of citric acid, and examples thereof include sodium citrate (sodium dihydrogen citrate and/or disodium hydrogen citrate) and potassium citrate (potassium dihydrogen citrate and/or dipotassium hydrogen citrate). Among them, the above-described metal citrate is preferably sodium citrate from the viewpoint of being easily available from the market. The above-described metal citrate is preferably a hydrate from the viewpoint of improving solubility.

In this aspect, the mole ratio of the amount of the silver compound to the amount of the metal citrate (the sum of the monovalent metal salt of citric acid and the divalent metal salt of citric acid) is preferably 1:0.8 to 1:1.2, more preferably 1:0.9 to 1:1.1, and still more preferably 1:0.95 to 1:1.05.

In addition, the mole ratio of the monovalent metal salt of citric acid to the divalent metal salt of citric acid in the above-described metal citrate may be appropriately set according to a desired composition ratio of the disilver hydrogen citrate-containing composition, but from the viewpoint of efficiently obtaining a disilver hydrogen citrate-containing composition excellent in solubility, the mole ratio is preferably 1:0 to 1:2.6, more preferably 1:0.02 to 1.0, and more preferably 1:0.05 to 1:0.20.

In the first aspect, when a silver compound and metal citrate are added, to a citrate buffer solution, in amounts by which the disilver hydrogen citrate-containing composition to be generated is in a saturated amount or more and the mixture is stirred then left to stand, silver citrate precipitates and settles, and thus the silver citrate is collected. The collection method is not particularly limited, and examples thereof include filtration and decantation. The pH of the aqueous solution is preferably kept substantially constant in this series of operations (from preparation of buffer solution to completion of the reaction). By keeping the above-described pH substantially constant, the percent yield of the disilver hydrogen citrate-containing composition can be improved. Examples of means for keeping the pH substantially constant include a method for adjusting the mole ratio of monovalent citrate ions to divalent citrate ions to a composition ratio corresponding to the citric acid equilibrium composition at the pH.

A second aspect of the present invention is a method for precipitating a disilver hydrogen citrate-containing composition by preparing an aqueous solution obtained by adding a silver compound and citric acid in such amounts that the disilver hydrogen citrate-containing composition is in a saturated amount or more, and adding a pH adjuster to the aqueous solution to adjust the pH to a desired pH. That is, this is a method for easily producing a pure disilver hydrogen citrate-containing composition in powder form, free of citric acid, by a filtering operation as solid-liquid separation, operation of light washing with water, and the like, by preparing an aqueous solution in which a silver compound and citric acid are added in such amounts that the disilver hydrogen citrate-containing composition to be generated is in a saturated amount or more, adding a pH adjuster to the aqueous solution to increase the pH of the solution to a desired pH, and precipitating a disilver hydrogen citrate-containing composition in an amount of the saturated amount or more from the aqueous solution. The disilver hydrogen citrate-containing composition is a composition containing disilver hydrogen citrate and silver dihydrogen citrate, or containing disilver hydrogen citrate and trisilver citrate, and can be obtained by a filtering operation as solid-liquid separation and an operation of light washing with water, by precipitating the composition as a crystalline mixture composed of a mole ratio of target components only by a discretionary operation of pH value adjustment.

In the method for producing a disilver hydrogen citrate-containing composition according to the second aspect, citric acid and a silver compound are added to a predetermined amount of a solvent. It is confirmed that the added chemicals is completely dissolved while the reaction mixture is stirred. Thereafter, the pH of the reaction mixture is checked, and subsequently a pH adjuster is added to the reaction mixture to increase the pH thereof to a predetermined pH value. After the reaction mixture reaches a predetermined pH, stirring is further continued and the reaction is completed. From the viewpoint of increasing the yield of the disilver hydrogen citrate-containing composition and efficiently collecting the disilver hydrogen citrate-containing composition, the final pH is preferably pH 2.0 to 5.5, and more preferably pH 3.5 to 4.5.

The "pH adjuster" of the present invention, which is used for increasing the pH value of the reaction mixture, is gradually accumulated in the system. The pH adjuster is thus preferably sodium hydroxide or potassium hydroxide which increases the solubility of nitrate to be generated, to prevent from precipitating the nitrate compound and prevent from mixing it into silver citrate. More preferred is sodium hydroxide. In addition, the pH adjuster is preferably added dropwise in a small amount as a form of the aqueous solution, and more preferably the sodium hydroxide aqueous solution is added dropwise in a small amount. A rapid increase in the pH value of the reaction mixture induces precipitation of poorly soluble trisilver citrate. When a strong base is used as the pH adjuster, it is preferred to carefully add dropwise the pH adjuster in a small amount. To increase the scale and/or speed of the reaction, the pH adjuster is preferably an aqueous solution having a pH of 2.0 to 5.5, preferred is an aqueous sodium citrate solution (containing disodium hydrogen citrate and/or sodium dihydrogen citrate), and more preferred is a disodium hydrogen citrate aqueous solution.

In the second aspect, the mole ratio of the amount of the silver compound to the amount of citric acid both of which are added in the first process is preferably 1:0.8 to 1:1.2, and more preferably 1:0.95 to 1:1.05. The reason for this is as follows. The reaction mixture is repeatedly used to effectively use silver. Therefore, when the equivalent ratio of silver and citric acid involved in the reaction changes due to the influence of the silver concentration remaining in the reaction mother liquor, the yield of silver citrate during the subsequent reaction varies.

In the second aspect, a silver compound and citric acid are required in amounts by which the disilver hydrogen citrate and/or the silver dihydrogen citrate, or the disilver hydrogen citrate and/or the trisilver citrate to be generated in the reaction mother liquor at a desired pH are in saturated amounts or more, and these chemicals are added to the reaction mixture with stirring, and then a pH adjuster is further added to prepare the reaction mixture to a desired pH value. At this time, when a pH adjuster is added, silver citrate precipitates in the reaction mixture accordingly, and when stirring is stopped, the silver citrate settles at the bottom of a reaction vessel. Then, the silver citrate is collected. The collection method is not particularly limited, and examples thereof include filtration and decantation.

Preferably, the collected disilver hydrogen citrate and silver dihydrogen citrate, or the collected disilver hydrogen citrate and trisilver citrate are lightly washed with water and then dried under normal pressure or in vacuo. By drying, disilver hydrogen citrate and silver dihydrogen citrate, or disilver hydrogen citrate and trisilver citrate can be obtained in powder form. When the proportion of the trisilver citrate in the precipitated disilver hydrogen citrate-containing composition increases, the precipitate becomes a sticky rice-cake-like state as in the case of Comparative Example 2-1 and is formed into a paste on a filter, which causes clogging and makes filtration difficult. On the other hand, as is clear from Example 2-8, it has been newly found that when the final pH of the mother liquor is adjusted to pH 5.5 or less to set the mole ratio of the trisilver citrate constituting the composition to 42% or less, filtering operation can be performed despite requiring some time for the filtrating operation of the precipitate, and it is possible to form the disilver hydrogen citrate-containing composition into powder.

The drying temperature is preferably 60° C. or lower, and more preferably 50° C. or lower from the viewpoint of suppressing thermal decomposition of the disilver hydrogen citrate-containing composition obtained by solid-liquid separation. The above-described drying may be performed by drying in vacuo or freeze drying.

In the second aspect of the present invention, the reaction mother liquor from which the disilver hydrogen citrate and the silver dihydrogen citrate, or alternatively the disilver hydrogen citrate and the trisilver citrate have been collected can be reused. The method is an efficient method for producing silver citrate with reduced loss of silver. That is, since the mother liquor from which the disilver hydrogen citrate-containing composition have been collected allows the precipitation of the disilver hydrogen citrate-containing composition by adding the silver compound and citric acid again to the reaction mother liquor and then further adding a pH adjuster, a homogeneous disilver hydrogen citrate-containing composition can be collected through the same operation. Incidentally, there is also a method in which citric acid and sodium citrate are added in advance to the aqueous solvent as described in Example 2-1B to obtain a buffer solution composition having a pH of about 2 to 5, alternative to the aqueous solvent in Example 2-1, to which citric acid and silver nitrate equivalent thereto are added at the first time of preparing the disilver hydrogen citrate-containing composition. In such method, since the pH of the system is stabilized during adding a pH adjuster dropwise to the reaction mixture, adjustment to a desired pH can be ensured. Such preparation is not necessary for the second and subsequent processes of precipitating the disilver hydrogen citrate-containing composition in the reaction mixture, in which the collected reaction mother liquor is reused.

When the disilver hydrogen citrate-containing composition is produced according to the production method of the present invention, nitrate (for example, sodium nitrate) accumulates in the reaction mother liquor as the number of times increases. However, even when nitrate is generated, the solubility of nitrate in water is so high that nitrate does not interfere with the reaction. Therefore, the method for producing a disilver hydrogen citrate-containing composition of the present invention is excellent in mass productivity. In addition, the amount of the reaction mother liquor gradually increases as the number of preparation times increases, but the generation of the disilver hydrogen citrate-containing composition is not inhibited.

Here, in an environment of a reaction mother liquor in which the pH exceeds 5.5, the resulting disilver hydrogen citrate-containing composition has a disadvantage that it is hardly dissolved in water and is difficult for filtration. This means that in the disilver hydrogen citrate-containing composition, the proportion of the mole ratio of trisilver citrate is more than 42% as compared with disilver hydrogen citrate, and thus the precipitate becomes a sticky rice-cake-like state and is formed into a paste on a filter, which causes clogging and prevents filtration. Further, it takes a long time when solid-liquid separation by decantation is forcibly performed. In addition, it takes too much time and cost to perform powderization, and further, in the dilution operation with water or a citric acid solution necessary for adjustment to the final use form for the market, it takes too much time than necessary due to poor solubility, which is not practical. The reason is that when the mole ratio of the trisilver citrate in the disilver hydrogen citrate-containing composition precipitated in the reaction mother liquor accounts for a large proportion exceeding 42%, the aggregation action between the fine particles by the trisilver citrate affects, and when an attempt is made to collect the precipitated product, the fine particles are formed into a paste on a filter at the time of filtration, and filtration cannot be performed. This new fact was confirmed from the result that it was difficult in this phenomenon to make an attempt to collect the precipitate of the disilver hydrogen citrate-containing composition obtained in Comparative Example 2-1 by subjecting the precipitate to filtration treatment and solid-liquid separation.

Currently, a citric acid solution containing silver dihydrogen citrate by an electrolysis method has been put into practical use. However, it is difficult to obtain a large amount of silver dihydrogen citrate on an industrial scale by this production method. In the production method (electrolysis method), a silver plate is immersed as an electrode plate in a citric acid solution, and a direct current is applied to the silver plate. As the reaction proceeds, water is also electrolyzed on the electrode surface, and minute bubbles cover the electrode surface, making it difficult for a current to flow, leading to deterioration of the production capacity of silver dihydrogen citrate. It takes a long time (for example, 144 hours) to increase the concentration of silver dihydrogen citrate as a final form to 2400 ppm. Therefore, the method is not suitable for industrial mass production, costs are high, and the silver concentration is limited to a maximum of about 2400 ppm in a solution of 6 wt % citric acid. Since the final form of the reactant is a citric acid solution in which silver dihydrogen citrate is dissolved, much space is occupied during storage and transportation. Further, a higher concentration of citric acid is required to obtain a higher concentration of silver ions. However, since high concentration of citric acid increases the viscosity of the citric acid solution, there is a disadvantage that workability at the time of production is deteriorated. Further, a silver dihydrogen citrate solution (silver concentration: 2400 ppm) produced by the electrolysis method can be powderized by freeze-drying in vacuo, but this increases the production cost. Moreover, since the obtained powder is mixed powder composed of 10% by weight of silver dihydrogen citrate and 90% by weight of citric acid, only a pure disilver hydrogen citrate-containing composition cannot be efficiently obtained.

On the other hand, according to the present invention, a disilver hydrogen citrate-containing composition that is easily dissolved in water or a citric acid solution can be obtained by a simple method and on an industrial scale. In addition, since the disilver hydrogen citrate-containing composition can be obtained as dried powder free of impurities, the occupied volume during storage and transportation can be reduced. Furthermore, due to the solubility of the disilver hydrogen citrate-containing composition, it is also easy to prepare a high-concentration silver citrate solution (for example, silver ion concentration: more than 2400 ppm) by adding the disilver hydrogen citrate-containing composition into a citric acid solution. The solution resulted from dissolution of the obtained powder of the disilver hydrogen citrate-containing composition in water or a citric acid solution can provide, by further dilution, a desired silver concentration of an antibacterial agent or an antiviral agent which is produced using such novel mixed powder containing the disilver hydrogen citrate mixed powder.

In one aspect of the present invention, the antibacterial or antiviral solution described above is preferably obtained by mixing a disilver hydrogen citrate-containing composition, obtained by the production method of the present invention, with a citrate buffer solution having a pH of 2.0 to 5.5, a pH of 2.5 to 5.5, preferably a pH of 3.0 to 5.0, and more preferably a pH of 3.5 to 4.5.

In another aspect of the present invention, the antibacterial agent or the antiviral agent is produced by mixing the disilver hydrogen citrate-containing composition obtained by the production method of the present invention with 1 wt % to 10 wt % of a citric acid solution, and preferably with 5 wt % to 7 wt % of a citric acid solution from the viewpoint of redissolving it in water or a citric acid solution. The antibacterial agent or the antiviral agent is preferably produced by further adding citric acid and sodium citrate to water to adjust a citrate buffer solution having a pH of 2.0 to 5.5, a pH of 2.5 to 5.5, preferably a pH of 3.0 to 5.0, and more preferably a pH of 3.5 to 4.5, and mixing the disilver hydrogen citrate-containing composition therewith.

According to the purpose, an antibacterial agent other than the disilver hydrogen citrate-containing composition or a publicly known additive, for example, an antiseptic, a stabilizer, a humectant, an ultraviolet absorber, flavor/fragrance, a surfactant, a viscosity modifier, a pH adjuster, and the like can be appropriately blended with the antibacterial agent or the antiviral agent described above, as an antibacterial agent and an antiviral agent.

The silver concentration in the antibacterial agent or the antiviral agent described above is not particularly limited, preferably 1.0 ppm to 200 ppm, more preferably 5 ppm to 100 ppm, and still more preferably 30 ppm to 50 ppm from the Example results herein, that is: the minimum inhibitory concentration of silver exhibiting an antibacterial effect on gram-negative bacteria, gram-positive bacteria, yeast, and fungi as clearly shown by Table 8 of Example 2-10, the silver concentration that enables exhibition of antiviral properties revealed from the antiviral test results in Tables 9 and 11 in the same example, and the silver concentration that does not have cytotoxicity and is safe from the test results in Tables 10 and 12 in the same example.

The disilver hydrogen citrate-containing composition of the present invention can exhibit an antibacterial effect by silver ions derived from a silver compound, regardless of the difference in the kind of bacteria and the presence or absence of acquisition of drug resistance of bacteria by antibiotics. In addition, by applying operation, impregnating operation, or the like, the surface of a target to be adhered is covered with the antibacterial agent or the antiviral agent obtained by diluting the powder of the disilver hydrogen citrate-containing composition of the present invention to a desired silver ion concentration with water or a citric acid solution. On a trace where the moisture has volatilized, the disilver hydrogen citrate-containing composition of the present invention remains on the surface. As a result, the processed surface to which the disilver hydrogen citrate-containing composition is adhered has an antibacterial or antiviral function. In addition, even if the processed surface is reapplied with alcohol or the like from thereabove, the effect lasts because the disilver hydrogen citrate-containing composition remains on the surface as it is once the alcohol or the like is evaporated. The effect of the antibacterial agent and the antiviral agent of the disilver hydrogen citrate-containing composition lasts indefinitely unless the surface is washed off with water or the like. Therefore, the agent can be used as a useful antibacterial agent or antiviral agent because the agent sustains high antibacterial properties and antiviral properties, has a wide antibacterial spectrum, and further has virus inactivation ability.

For example, the following matter is hereby considered. In the List N, listing disinfectant products effective against COVID-19 approved by the United States Environmental Protection Agency (EPA), PURE (registered trademark) Hard Surface disinfectant (EPA Reg. No. 72977-5-73912) was additionally listed in the List N on Jun. 24, 2020 upon approval by the United States Environmental Protection Agency (EPA). The PURE (registered trademark) Hard Surface disinfectant seems to be made using Silverion2400 that contains silver dihydrogen citrate and citric acid and manufactured by PURE Bioscience, Inc. PURE Bioscience, Inc. has announced that among the disinfectants in these lists, the PURE (registered trademark) Hard Surface disinfectant is an EPA-registered disinfectant for food contact surfaces, in which safety thereof is approved and the food does not need to be washed off even if the food is brought into direct contact with the disinfectant, and is highly safe and further has sufficient bactericidal power against COVID-19, while ensuring that the residual properties of its ability is maintained for 24 hours or more. The technical materials clearly disclose that the function of its safe antibacterial or antiviral power is attributed to the silver ions in the silver dihydrogen citrate, and the silver concentration thereof is specified as 30 ppm. Therefore, according to the following processes, the amount of 12,400 liters to 19,280 liters can be easily and quickly secured as the amount of the antibacterial agent or the antiviral agent when the silver concentration is adjusted to 30 ppm same as the PURE (registered trademark) Hard Surface disinfectant by using 1 kg of powder having a 36.1% or more and 53.2% or less of silver concentration of the disilver hydrogen citrate-containing composition of the present invention containing silver dihydrogen citrate. The processes include: first, preparing a citric acid aqueous solution in which a concentration of a citric acid monohydrate is adjusted to about 5 wt % with deionized water purer than or equal to purified water treated by a process using an ion exchange resin, a reverse osmosis (RO) membrane process, an electrodeionization (EDI) process, or the like; then preparing and storing a citric acid-dissolving stock solution of a disilver hydrogen citrate-containing composition having a silver concentration of 2,400 ppm, obtained by diluting 1 kg of the disilver hydrogen citrate-containing composition of the present invention to 155 times to 241 times and dissolving it in the citric acid aqueous solution; and furthermore, if necessary, adjusting a solution having a silver concentration of 30 ppm, obtained by diluting the stock solution to 80 times with the deionized water. When the solution is used such that the solution is directly spray-applied to the face, head, fingers, wrists, or the like as an antibacterial agent or an antiviral agent, and the liquid of the antibacterial agent or the antiviral agent is uniformly spread over the entire surface of the skin, hair, or the like with one's own hand, assuming that a sufficient amount per one time required for one person is about 10 ml, the spray application on these sites can be performed a total of 1,240,000 times to 1,928,000 times. Further, on a trace where moisture thereof is evaporated, the antibacterial agent or the antiviral agent remains in a uniform and high-concentration state on the surface of the skin or the like, and the effect thereof lasts until the surface is washed off with water.

In addition, when an antibacterial agent or an antiviral agent diluted to a silver concentration of 30 ppm is spray-applied all over a porous material such as a mask, clothes, living space, or a filter, the antibacterial agent or the antiviral agent adheres to the porous surface thereof and similarly remains in a uniform and high-concentration state on a trace where the moisture thereof has evaporated, and the effect thereof lasts until the porous surface is washed off with water.

Furthermore, when an antibacterial agent or an antiviral agent diluted to a silver concentration of 30 ppm is spray-applied all over a nonporous material such as tableware, metal, glass, a building material, plastic, a floor, a tile, and concrete, the antibacterial agent or the antiviral agent adheres to the nonporous surface thereof and similarly remains in a uniform and high-concentration state on a trace where the moisture thereof has evaporated similarly, and the effect thereof lasts until the nonporous surface is washed off with water.

Here, the following example is considered as a recent case. On the aircraft carrier USS Theodore Roosevelt, an outbreak of infection of COVID-19 occurred on board by some crews affected with COVID-19, and finally about 60% of the 5,000 crews were infected during the passage, which is a problem that is still fresh in memories. At that time, it could have been difficult to always keep the disilver hydrogen citrate-containing composition in a diluted solution form having a silver concentration of 30 ppm from 12,400 liters (62 drums, 200 L each) to 19,280 liters (96 drums, 200 L each) for unexpected emergency. However, if 1 kg of the powder of the disilver hydrogen citrate-containing composition of the present invention, which is a new form requiring the least occupied space, and 12.05 kg of citric acid monohydrate were stored in containers having a humidity-blocking and light-shielding function, such as a pail in the aircraft carrier, it is considered that a 10 ml solution of the antibacterial agent or the antiviral agent having a diluted silver concentration of 30 ppm using the powder of the disilver hydrogen citrate-containing composition and the citric acid monohydrate, obtained by using a device for obtaining the deionized water, which is considered to be provided in all the vessels, could have been applied to the crews as an antibacterial agent or antiviral agent having a lasting efficacy against the COVID-19 for a total of 1,240,000 to 1,928,000 people. Furthermore, such antibacterial agent or antiviral agent having the amount remaining after spray-applied to the skin, head, and the like of people could have been splay-applied to all objects made of a porous material or a nonporous material and likely to be touched by a person. Therefore, it can be easily assumed that this unexpected emergency could have been appropriately coped with by sustainable antibacterial power and antiviral power functions.

The "antibacterial agent" or the "antiviral agent" in the present invention can be used in the medical field as a composition of an antibacterial agent or an antiviral agent in any product form, such as a medical bactericide as a pharmaceutical product; a wound covering agent; a burn covering agent; a decubitus covering agent; a gastric fistula, an intestinal fistula, a percutaneous endoscopic gastrostomy (PEG), and the like; a catheter; an indwelling needle; gauze/bandage/dressing/plaster cast for covering an affected area. In addition, the antibacterial agent or the antiviral agent can be used as a composition of an antibacterial agent or an antiviral agent in any product form for preventing a secondary infection from an object that may be touched by a person, including: medical devices; office equipment; home electric appliances; lockers; in-hospital medical workers' clothes in general, masks, protective goggles, surgical caps, gloves, protective gowns, aprons, and the like; in-hospital sickbeds, blankets, sheets, blanket covers, pillows, pillow covers, partition curtains, and the like; patient rooms, intensive care units, consultation rooms, treatment rooms, examination rooms, physical therapy rooms, corridors, medical offices, pharmacies, secretariats, dining rooms, kitchens, bathrooms, restrooms, waiting rooms, and the like; and medical waste and laundry.

The "antibacterial agent" or the "antiviral agent" in the present invention is involved in the personal care field, that is, disinfectants for face, head, hand, foot, whole body, hair, body hair, and skin; sanitary products for women; intimate care products; foot care products; oral care products such as toothpaste; dental froth products; sunscreens; after-sun care products; and lipstick products. In the field of cosmetics, the antibacterial agent or antiviral agent is involved in basic cosmetics, makeup, armpit deodorant, armpit antiperspirant, shampoo, rinse, conditioner, treatment, and cleansing agents. In the medical field, the antibacterial agent or the antiviral agent can be used as a composition of an antibacterial agent or an antiviral agent in any product form related to hair growth/density increasing agents, depilatory, bleaching agents, hair coloring agents, anti-acne agents, and disinfection of the inside of an oral cavity, an anus, a urethra, a vagina, or the like.

The "antibacterial agent" or the "antiviral agent" in the present invention can be used in: all areas of activity of the military and the Self-Defense Force; all areas of activity of the police; all areas of activity of the Japan Coast Guard; all areas of activity of the fire/ambulance services; all areas of activity of kindergartens, nursery schools, childcare facilities, play games, playthings, schools, and dormitories, dining rooms, and the like thereof; and further in all articles that are touched by a person inside a home, a hospital, a nursing facility, a hotel, a hairdressing room, a barber shop, a restaurant, a sports gym, an office, a workplace, a factory/plant, a public facility, and a transportation means such as an airplane, a helicopter, a train, a bus, a monorail, a gondola, a ship, an automobile, and the like; and the inside of air conditioners, a filter, and the like.

Among these, the antibacterial agent or the antiviral agent can be used for, for example, doors, furniture, fabric products, home electric appliances, switches, tableware, cooking utensils, cooking tables, sinks and the like, floor surfaces, wall surfaces, glass windows, bathtubs, toilet bowls, bedding, goods for infants and toddlers, playthings, equipment, devices, peripheral devices, tools, desks, desk peripheral devices, members inside automobiles, clothing, masks, protective goggles, gloves, caps, shoes, and aprons. The antibacterial agent or the antiviral agent can be used as a composition of an antibacterial agent or an antiviral agent for a product of a new functional agent in combination with a surface cleaning composition including detergent, soil suspender, fluorescent brightener, abrasive, or the like, or waxes or the like.

The "antibacterial agent" or the "antiviral agent" in the present invention can be used in the field of food processing plants as a composition of an antibacterial agent or an antiviral agent in any product form for: hygiene maintenance management of machine parts, peripheral devices thereof, tools, the inside of air conditioners, filters and the like, processes regarding a food contact inner surface, the inside of food packaging materials, and the like; hygiene maintenance management of all work environments, clean environment preservation facilities, articles, surfaces, space, and the like; and hygiene maintenance management of all clothes, caps, masks, protective goggles, gloves, shoes, and the like, worn by workers.

The "antibacterial agent" or the "antiviral agent" in the present invention can be used in the agricultural field as an antibacterial agent or antiviral agent in a product form including: a disease control agent in place of an antibiotic or an organic agricultural chemical used for protection from microbial contamination and keeping freshness of harvested fruits, vegetables, root vegetables, rhizomes, bulbs, fish and shellfish, and meat in general, and for controlling mold, bacteria, and viruses of cereals and the like; and a highly safe agricultural chemical or the like in place of an organic agricultural chemical or the like for fungus, bacteria, and viruses which cause soil-borne disease.

The "antibacterial agent" or the "antiviral agent" in the present invention can be used in the livestock field as a composition of an antibacterial agent or an antiviral agent in product form for: hygiene maintenance management for articles in all processes in which meat is touched in a meat slaughtering/dressing process, surfaces, space and surfaces of meat itself, machine parts, peripheral devices thereof, the inside of air conditioners, filters, tools and the like, processes regarding a food contact inner surface, and the like; hygiene maintenance management of all work environments, clean environment preservation facilities, articles, surfaces, space, and the like; hygiene maintenance management of all clothes, caps, masks, protective goggles, gloves, shoes, worn by workers; and further, all animal drugs for livestock communicable disease (bovine dermatomycosis, dairy cattle breast inflammation, avian influenza, classical swine fever, or the like) caused by all mold, bacteria, and viruses.

The "antibacterial agent" or the "antiviral agent" in the present invention can be used in an industrial field as a composition an antibacterial agent or an antiviral agent in any product form for: filters and cooling water of cooling towers, dryers, and compressors or the like; water pools; swimming pools; hot water systems; air conditioning systems; hot springs and mineral springs; water treatment equipment such as pipes, tanks, water treatment apparatuses, peripheral devices, pumps, and the like; or antiseptics, antifungal agents, antimicrobial agents, or the like. As described above, the antibacterial agent or the antiviral agent in the present invention can be used for various industrial uses.

The "antibacterial agent" or the "antiviral agent" in the present invention can be used in any manner, including a product form in which a film is formed on the surface of any object by a method such as nebulizing, applying, spraying, immersion, or transferring; a product form in accordance with the using method conforming to its product shape of any liquid, solid, semi-solid, gel, sol, stick, or capsule shape; and a fiber itself having a sustained release effect or an emergency treatment effect in an emergency, or a product form of a composition containing the fiber in a bag shape, a container, a capsule, or the like.

In addition, for example, by using the powder of the novel disilver hydrogen citrate-containing composition of the present invention as deodorant, due to having an oxidizing power derived from silver, the disilver hydrogen citrate-containing composition can react with components such as a sulfur-based gas, an amine-based gas, an aldehyde-based gas, propionic acid, and isovaleric acid that cause malodor to be deodorized, and can exhibit an effect as deodorant.

When this novel disilver hydrogen citrate-containing composition powder obtained by the production method of the present invention is used as an antiviral agent, the agent can exhibit an effect as a useful antiviral agent capable of inactivating, for example, a mutant virus strain such as the H5N1 subtype virus that is a cause of highly pathogenic avian influenza (HPAI) having an envelope similar to that of an influenza A virus (H3N2). In addition, although the virus responsible for severe acute respiratory syndrome (SARS) or the pathogenic coronavirus COVID-19 also has a protein structure of a spike different from that of influenza, it is still considered that inactivation can be similarly performed as long as it has an envelope sensitive to silver ions.

Composition of Precipitated Disilver Hydrogen Citrate-Containing Composition

The mole ratio of silver dihydrogen citrate to disilver hydrogen citrate, or silver dihydrogen citrate to trisilver citrate in a disilver hydrogen citrate-containing composition is calculated as described below.

As can be seen from the molecular formula of silver citrate, silver dihydrogen citrate has the molecular formula of $C_6H_7O_7 \cdot Ag$. Molecular weight thereof is 298.99. Therefore, since the atomic weight of silver is 107.87, the silver concentration of silver dihydrogen citrate is 107.87/298.99×100=36.1 wt %. Similarly, the molecular formula of disilver hydrogen citrate is represented by $C_6H_6O_7 \cdot 2Ag$, and molecular weight thereof is 405.86. Therefore, the silver concentration of the disilver hydrogen citrate is 107.87×2/405.86×100=53.2 wt %. Trisilver citrate is represented by $C_6H_5O_7 \cdot 3Ag$. Molecular weight thereof is 512.73. Therefore, the silver concentration of the trisilver citrate is 107.87×3/512.73×100=63.1 wt %.

That is, the fact that the concentration of silver contained in the obtained disilver hydrogen citrate-containing composition is in the range of 36.1 wt % to 53.2 wt % indicates that the silver citrate is composed of silver dihydrogen citrate and disilver hydrogen citrate. Similarly, the fact that the silver concentration in the disilver hydrogen citrate-containing composition is in the range of 53.2 wt % to 63.1 wt % indicates that the disilver hydrogen citrate-containing composition is composed of disilver hydrogen citrate and trisilver citrate.

Calculation of Composition Ratio by Mole of Silver Dihydrogen Citrate and Disilver Hydrogen Citrate For example, it is assumed that the silver concentration of the obtained disilver hydrogen citrate-containing composition is 49.5 wt %. This means that the silver concentration in the disilver hydrogen citrate-containing composition is in the range of 36.1 wt % to 53.2 wt %, which indicates that the sample is a composition containing silver dihydrogen citrate and disilver hydrogen citrate.

Here, when the abundance ratio of silver dihydrogen citrate (weight) is X (0<X<1), the following equation holds:

$$36.1X+53.2(1-X)=49.5 \quad \text{(Equation 1)}$$

From this, X=0.217 is determined, and it is found that the disilver hydrogen citrate-containing composition is composed of 21.7 wt % of silver dihydrogen citrate and 78.3 wt % of disilver hydrogen citrate.

Furthermore, the mole ratio of each component can be determined by dividing the weight ratio (wt %) of each silver citrate by the molecular weight of the respective silver citrate. Thus calculated, the mole ratio of silver dihydrogen citrate to disilver hydrogen citrate in this silver citrate was 0.27 to 0.73.

Composition Ratio by Mole of Disilver Hydrogen Citrate And Trisilver Citrate

For example, similarly to the above-described calculation example, it is assumed that the silver concentration of the obtained disilver hydrogen citrate-containing composition is 57.9 wt %. This means that the silver concentration in the disilver hydrogen citrate-containing composition is in the range of 53.2 wt % to 63.1 wt %, which indicates that the sample is a composition containing disilver hydrogen citrate and trisilver citrate.

Here, when the abundance ratio of disilver hydrogen citrate (weight) is Y (0<Y<1), the following equation holds:

$$53.2Y+63.1(1-Y)=57.9 \quad \text{(Equation 2)}$$

From this, Y=0.527 is determined, and it is found that the sample is composed of 52.7 wt % of disilver hydrogen citrate and 47.3 wt % of trisilver citrate.

Furthermore, the mole ratio of each component can be determined by dividing weight ratio (wt %) of each component by the molecular weight of the respective silver citrate. Thus calculated, the mole ratio of disilver hydrogen citrate to trisilver citrate in this disilver hydrogen citrate-containing composition was 0.58 to 0.42.

Hereinafter, the embodiments of the present invention will be described in more detail based on examples, but the present invention is not limited by these examples.

EXAMPLES

Example 1: Production of Disilver Hydrogen Citrate-Containing Composition (pH of Citrate Buffer Solution: 4.0)

In 1000 mL of ion-exchanged water, 14.0 g of citric acid monohydrate and 9.8 g of trisodium citrate dihydrate were dissolved to prepare a citrate buffer solution having a pH of 4.0. Subsequently, 2.85 g (16.8 mmol) of silver nitrate, 0.40 g (1.54 mmol) of disodium hydrogen citrate sesquihydrate, and 3.55 g (16.6 mmol) of sodium dihydrogen citrate monohydrate were dissolved in the prepared citrate buffer solution to prepare a saturated aqueous solution of disilver hydrogen citrate and silver dihydrogen citrate.

To the obtained saturated aqueous solution of disilver hydrogen citrate and silver dihydrogen citrate, 8.16 g (48 mmol) of precisely weighed silver nitrate was added with stirring, subsequently 10.14 g (44 mmol) of sodium dihydrogen citrate monohydrate and 1.14 g (4.3 mmol) of disodium hydrogen citrate sesquihydrate were added thereto, and the mixture was stirred for three hours. The resulting sediment was collected by suction filtration using No. 5C standard filter paper (pore size: 1 μm) and dried at 50° C. in vacuo overnight to obtain a mixture of silver dihydrogen citrate and disilver hydrogen citrate in powder form. The silver concentration in the filtrate (mother liquor)

measured using a plasma emission spectroscopy ("ICP S 8000" manufactured by SHIMADZU CORPORATION) was 1810 ppm.

Subsequently, 20 mL of a citrate buffer solution having a pH of 4.0 was added to 980 mL (pH 4.0) of the mother liquor after filtration of the target product in Example 1 to make 1000 mL. To this mother liquor, 8.16 g (48 mmol) of silver nitrate was added with stirring, and subsequently 10.14 g (44 mmol) of sodium dihydrogen citrate monohydrate and 1.14 g (4.3 mmol) of disodium hydrogen citrate sesquihydrate were added thereto, and the mixture was stirred for three hours. A resulting sediment was collected and dried in the same manner as in Example 1. This operation was repeated 10 times. The amounts of silver nitrate, sodium dihydrogen citrate monohydrate, and disodium hydrogen citrate sesquihydrate added to the mother liquor in the second and subsequent times are respectively identical to those added to the saturated aqueous solution of disilver hydrogen citrate and silver dihydrogen citrate in the first time. Note that the pH of the mother liquor was adjusted so as to maintain about 4.0. The results of Example 1 are listed in Table 1 (In the table, the "number of times" means the number of times of generation of disilver hydrogen citrate and silver dihydrogen citrate, and the "second time" means that the mother liquor is reused for the first time.).

TABLE 1

| Number of Times | $1^{st}$ Time | $2^{nd}$ Time | $3^{rd}$ Time | $5^{th}$ Time | $10^{th}$ Time |
|---|---|---|---|---|---|
| Silver Concentration in Mother Liquor (ppm) | 1810 | 1860 | 1820 | 1850 | 1820 |
| Obtained Disilver Hydrogen Citrate and Silver Dihydrogen Citrate (g) | 9.65 | 9.81 | 9.62 | 9.74 | 9.57 |
| Percent Yield (%) | 96.3 | 99.1 | 97.2 | 98.4 | 96.7 |

As shown in Table 1, according to the method of the present invention, disilver hydrogen citrate and silver dihydrogen citrate in powder form can be obtained in high yield, and furthermore, by reusing the mother liquor, disilver hydrogen citrate and silver dihydrogen citrate can be obtained any number of times without reducing the percent yield. In addition, since a special material such as zeolite is not used, pure disilver hydrogen citrate and silver dihydrogen citrate free of impurities can be obtained.

Examples 2 to 4 and Comparative Example 1: Production of Disilver Hydrogen Citrate-Containing Composition (pH of Citrate Buffer Solution: 3.0 to 6.0)

The same procedure as in Example 1 was carried out to obtain a disilver hydrogen citrate-containing composition, except for the following. That is, the pH of the citrate buffer solution was changed by changing the amounts of citric acid and trisodium citrate, and to the citrate buffer solution, reaction reagents (silver nitrate, disodium hydrogen citrate, and sodium dihydrogen citrate) were added in amounts by which the disilver hydrogen citrate-containing composition to be generated is in a saturated amount or more, without preparing a saturated aqueous solution of the disilver hydrogen citrate-containing composition. The collectability of the disilver hydrogen citrate-containing composition (product) by filtration was evaluated according to the following evaluation criteria. The results are listed in Table 2.

[Evaluation Criteria of Product Collectability by Filtration]

○: a circle mark indicates that time required for filtration is less than 10 minutes Δ: a triangle mark indicates that time required for filtration is 10 minutes or more and less than two hours X: a cross mark indicates that time required for filtration is two hours or more, or product cannot be collected by filtration.

TABLE 2

| | | Example 2 | Example 3 | Example 4 | Comparative Example 1 |
|---|---|---|---|---|---|
| pH of Citrate Buffer Solution | | 3.0 | 4.0 | 5.5 | 6.0 |
| pH Adjuster (g) | Citric Acid (Monohydrate) | 19.0 | 13.9 | 6.2 | 3.6 |
| | Trisodium Citrate (Dihydrate) | 2.7 | 9.8 | 20.5 | 24.1 |
| Added reaction reagent to Citrate Buffer Solution (g) | Silver Nitrate | 10.0 | 10.0 | 10.0 | 10.0 |
| | Sodium Dihydrogen Citrate (Monohydrate) | 6.15 | 7.20 | 1.77 | 0.52 |
| | Disodium Hydrogen Citrate (Sesquihydrate) | 0 | 1.63 | 5.15 | 5.09 |
| Silver Concentration in Mother Liquor (ppm) | | 3490 | 1880 | 860 | 290 |
| Product (g) | | 7.60 | 11.7 | 11.0 | 11.1 |
| Percent Yield (%) | | 96.0 | 99.0 | 99.1 | — (99.7)※ |
| Product Collectability by Filtration | | ○ | ○ | Δ | x |

*Collected by decantation because it was not able to collect by filtration

As shown in Table 2, when the pH of the citrate buffer solution was 2.5 to 5.5, the time required for collecting the disilver hydrogen citrate-containing composition was short, and the disilver hydrogen citrate-containing composition in powder form was able to be efficiently obtained. In particular, when the pH of the citrate buffer solution was in the range of 3.0 to 4.5, the time required for filtration of the solution including the sediment was as short as less than 10 minutes. In the case where pH was 3.0, since the reactivity of silver nitrate and citric acid was inferior to that in the case where pH was 4.0, a large amount of silver nitrate remained in the mother liquor, and the yield of the disilver hydrogen citrate-containing composition was reduced. On the other hand, when the pH of the citrate buffer solution was 6.0, the product was not able to collect even by performing the operation of suction filtration for 15 hours or more. Therefore, the solution was left to stand for two days, and then decanted to remove the liquid portion, whereby the product was collected. This result suggests that when the pH of the citrate buffer solution was 6.0, trisilver citrate was contained in a large amount in the product, which was inappropriate for producing a disilver hydrogen citrate-containing composition in powder form.

Note that the theoretical mole ratio of disilver hydrogen citrate to silver dihydrogen citrate in the product obtained in Example 3 is 1:5.0, and the theoretical mole ratio of disilver hydrogen citrate to silver dihydrogen citrate in the product obtained in Example 4 is 1:0.17.

Example 5: Production and Evaluation of Antibacterial or Antiviral Solution

[Effect on Bacteria]

In 500 mL of a citrate buffer solution (10 mass % citric acid) having a pH of 4.0, 3.4 g of the powder of disilver hydrogen citrate and silver dihydrogen citrate obtained in Example 1 was added to and dissolved, whereby an antibacterial solution was obtained. The silver ion concentration in the obtained solution, measured using a high frequency inductively coupled plasma (ICP) emission spectroscopy ("ICP S-8100" manufactured by SHIMADZU CORPORATION), was 2650 ppm.

Using the obtained antibacterial or antiviral solution, the antibacterial performance was evaluated by measuring the minimum inhibitory concentration (MIC) of silver ions against various bacteria according to the agar dilution method, which is a standard method specified by the Japanese Society of Chemotherapy. That is, each bacteria was cultured in Mueller-Hinton Broth (MHB) medium (30.0% meat extract (w/v), 1.75% casamino acid (w/v), 0.15% soluble starch (w/v), pH 7.3±0.1), and a bacterial suspension for inoculation was prepared so that the number of bacteria to be tested was $1.0\times10^4$ to $5.0\times10^4$ CFU/mL. Based on a sample obtained by diluting the above-described solution with MHB medium (silver ion concentration: 2650 ppm) to 10 times (silver ion concentration: 265 ppm), a two-fold dilution series was prepared up to a silver ion concentration of 0.5 ppm. Each sample was cultured for 24 hours under conditions of 100 to 200 rpm (horizontal shaking), an amplitude of 40 to 60 mm, and 35 to 37° C. so as to be uniformly mixed. The results are listed in Table 3.

TABLE 3

| | Antibacterial Solution | |
|---|---|---|
| Bacterial species | vol % | MIC Silver Concentration(ppm) |
| *Escherichia coli* | 0.08 | 2 |
| *Staphylococcus aureus* | 0.16 | 4 |
| *Pseudomonas aeruginosa* | 0.08 | 2 |
| *Klebsiella pneumoniae* | 0.08 | 2 |
| *Bacillus subtilis* | 0.16 | 4 |
| *Candida albicans* | 0.16 | 4 |
| *Trichophyton mentagrophytes* | 0.16 | 4 |
| *Aspergillus niger* | 0.63 | 17 |

[Effects on Viruses]

All the following tests were performed in an environment of 25° C., and an influenza A virus (H3N2) was used as a test virus, and Madin-Darby canine kidney cells were used as host cells.

(1) Antiviral Test

After precisely weighing 6.16 g of the powder of disilver hydrogen citrate and silver dihydrogen citrate obtained in Example 1, this powder was dissolved in 1000 ml of a citrate buffer solution having a pH of 4.0, whereby a stock solution having a silver concentration of 2400 ppm was prepared. Next, 12.5 ml of this stock solution was added to 990 ml of ion-exchanged water whereby an antiviral solution was obtained. The silver ion concentration in the obtained solution, measured using a high frequency inductively coupled plasma (ICP) emission spectroscopy ("ICP S-8100" manufactured by SHIMADZU CORPORATION), was 30 ppm.

To 9 mL of commercially available phosphate buffered saline (PBS) or the obtained antiviral solution, 1.0 mL of a test virus suspension of $1.6\times10^8$ PFU/mL was added, and the mixture was left to stand at 25° C. for 5 minutes or 10 minutes, whereby a test solution was obtained. The test solution was collected in an amount of 0.5 mL, added to 4.5 mL of a activation inhibitor (SCDLP medium), and the resulting solution was mixed, whereby the reaction was stopped, and the virus infectivity titer of the surviving virus was evaluated by a plaque method. The results are listed in Table 4.

(2) Host Cell Validation Test (2-1) Cytotoxicity Test

To 4.5 mL of the activation inhibitor, 0.5 mL of the above antiviral solution was added and the resulting solution was mixed, and the cells were stained by a plaque method, whereby the presence or absence of cytotoxicity was determined. The results are listed in Table 5.

(2-2) Verification of Cell Sensitivity to Virus

To 9 mL of the activation inhibitor, 1.0 mL of commercially available phosphate buffered saline (PBS) or the above antiviral solution was added and the resulting solution was mixed, and 5 mL of the mixed solution was collected and transferred to a test tube.

An influenza A virus (H3N2) suspension was prepared so as to be $4\times10^4$ to $6\times10^4$ PFU/mL, and 0.05 mL of this suspension was added to the above test tube.

After standing at 25° C. for 30 minutes, the virus infectivity titer was measured by a plaque method, to verify cell sensitivity to the virus. The results are listed in Table 5.

TABLE 4

| Test Sample | | Virus Infectivity Titer (PFU/mL) (Common Logarithm Average) |
|---|---|---|
| Antiviral Solution(Silver Concentration: 30 ppm) | Standing for 5 min. | <2.00 |
| | Standing for 10 min. | <2.00 |
| PBS (Phosphate Buffered Saline) | Immediately after mixing | 7.50 |
| | Standing for 5 min. | 7.45 |
| | Standing for 10 min. | 7.43 |

TABLE 5

| Test Sample | Presence or Absence of Cytotoxicity | Virus Infectivity Titer (PFU/mL) (Common Logarithm Average) |
|---|---|---|
| Antiviral Solution(Silver Concentration: 30 ppm) | None | 2.58 |
| PBS (Phosphate Buffered Saline) | None | 2.56 |

As shown in Table 3, the antibacterial solution of the present invention had a wide antibacterial spectrum, and had a strong antibacterial effect on gram-negative bacteria such as *Escherichia coli, Pseudomonas aeruginosa*, and *Klebsiella pneumoniae*. Further, the antibacterial solution of the present invention had an antibacterial effect similarly on gram-positive bacteria such as *Staphylococcus aureus* and *Bacillus subtilis*, pathogenic yeast such as *Candida albicans*, and fungi such as *Trichophyton mentagrophytes* and *Aspergillus niger*. Furthermore, as shown in Tables 4 and 5, the antiviral solution of the present invention had no cytotoxicity, and exhibited a remarkable inactivation effect on viruses such as influenza viruses. In addition, in the antiviral solution of the present invention, a significant decrease in the sensitivity of cells to viruses was not observed.

Example 6: Determination of Produced Disilver Hydrogen Citrate-Containing Composition The crystal structure of the disilver hydrogen citrate-containing composition of the present invention obtained in Example 1 and powder containing disilver hydrogen citrate and/or silver dihydrogen citrate obtained by drying a commercially available silver dihydrogen citrate aqueous solution ("TINOSAN SDC" manufactured by Ciba Specialty Chemical Corporation) was analyzed using an X-ray diffractometer ("XRD-6100 type" manufactured by SHIMADZU CORPORATION). As a result, the main XRD peaks of the disilver hydrogen citrate-containing composition obtained by the production method of the present invention (FIG. 1) and the powder containing disilver hydrogen citrate and/or silver dihydrogen citrate obtained by drying a commercially available silver dihydrogen citrate aqueous solution (FIG. 2) were coincident with each other, and thus it was determined that the product in powder form obtained by the production method of the present invention was a disilver hydrogen citrate-containing composition.

Example 2-1: Production of Disilver Hydrogen Citrate-Containing Composition in the Case of Final pH 4.0 of Reaction Mixture At room temperature (25° C.), 20.8 g (0.10 mol) of citric acid monohydrate and 17.0 g (0.1 mol) of silver nitrate were precisely weighed and added to 1000 mL of ion-exchanged water, whereby a reaction mixture was prepared. To the reaction mixture in which the added chemicals were completely dissolved to become clear, a sodium hydroxide solution (8 wt %) was added dropwise little by little, and the reaction mixture that had reached pH 1.6 was raised to a pH of 4.0. After 2 to 3 minutes from the start of dropwise addition of the sodium hydroxide solution, the reaction mixture started to become cloudy. After the reaction mixture reached pH 4.0, stirring was further continued for three hours to accelerate the reaction. In this way, a supersaturated aqueous solution in which the disilver hydrogen citrate-containing composition is precipitated was prepared. Thereafter, stirring was stopped, and the reaction mixture was subjected to solid-liquid separation by suction filtration using No. 5C standard filter paper (pore size: 1 μm), the filtration residue was then lightly washed with water and placed in a sealed dryer, and dried at 50° C. in vacuo for two weeks. As a result, 18.95 g of a disilver hydrogen citrate-containing composition in powder form was obtained. The vacuum pump used at that time was a diaphragm type vacuum pump (DA-20 type manufactured by ULVAC KIKO, Inc.), and the air pressure in the dryer was always maintained at 0.05 atm or less.

In the analysis of the silver concentration in the reaction mother liquor which is filtrate obtained through solid-liquid separation by suction filtration, a small amount of the pipetted mother liquor was diluted with a dilute nitric acid solution, and the diluted solution was measured using a plasma emission spectroscopy (ICP S 8000 manufactured by SHIMADZU CORPORATION), and thereby the silver concentration was 2200 ppm. To measure the silver concentration in the disilver hydrogen citrate-containing composition obtained by making solid-liquid separated filtration residue into powder form in the above manner, a small amount thereof pipetted was precisely weighed, and was dissolved in 100 ml of dilute nitric acid (2 M/L) to prepare a sample. The silver concentration was determined by the above-described ICP analysis.

The silver concentration of the disilver hydrogen citrate-containing composition powder was 49.5 wt %. The silver concentration in the disilver hydrogen citrate-containing composition is thus in the range of 36.1 wt % to 53.2 wt %, suggesting that the sample in this Example is a composition composed of silver dihydrogen citrate and disilver hydrogen citrate according to the above-described calculation method. As a result of the mole ratio in this exemplified calculation method, the mole ratio of silver dihydrogen citrate to disilver hydrogen citrate in the disilver hydrogen citrate-containing composition was 0.27 to 0.73.

Example 2-1B: Production of Disilver Hydrogen Citrate-Containing Composition in the Case of Replacing First Ion-Exchanged Water of Example 2-1 with Citrate Buffer Solution (pH 4) Only for First Time Whether the adjustment of the pH of the mother liquor to a desired pH by adding dropwise a sodium hydroxide solution is affected by replacing ion-exchanged water of Example 2-1 with a citrate buffer solution (pH 4) only for the first time and thereby the reaction product is affected was examined. A citrate buffer solution (pH 4) was prepared in accordance with the preparation method of Example 2-1 described above, and a buffer solution having a pH of 4 was prepared by previously adding 14.0 g of citric acid monohydrate and 12.6 g of sodium citrate dihydrate to 1000 mL of ion-exchanged water. Subsequently, in the same manner as in Example 2-1, 20.8 g (0.1 mol) of citric acid monohydrate and 17.0 g (0.1 mol) of silver nitrate were precisely weighed and added to the above-described citrate buffer solution (pH 4). Subsequently, in Example 2-1, 98 ml of a sodium hydroxide solution (8 wt %) was added dropwise to the reaction mother liquor at a rate of about 10 ml/min., and the pH was adjusted to 4. The dropwise addition took about 15 minutes. On the other hand, in Example 2-1B, 80 ml of a sodium hydroxide solution (8.0 wt %) was added at a time, and the remaining 21 ml was carefully added dropwise to prepare the pH of the mother liquor to pH 4. The time required for that was about 3 minutes. Subsequent preparation processes were the same as in Example 2-1. In this way, 19.35 g of a disilver hydrogen citrate-containing composition in powder form was obtained. In Example 2-1B, the operation time can be shortened as compared with Example 2-1. Such method for preparing a disilver hydrogen citrate-containing composition is also available, but it is necessary to add a process of preparing a citrate buffer solution (pH 4), and further, citric acid and sodium citrate are separately required as raw materials for the citrate buffer solution (pH 4).

Example 2-2: Production of Disilver Hydrogen Citrate-Containing Composition Reusing Reaction Mother Liquor (pH 4.0)

To 1.12 L of the reaction mother liquor which is filtrate obtained from Example 2-1 through solid-liquid separation by suction filtration, 20.8 g (0.10 mol) of citric acid (monohydrate) and 17.0 g (0.1 mol) of silver nitrate were precisely weighed according to Example 2-1 and added with stirring. To the reaction mixture in which the added chemicals were completely dissolved and to become completely clear, a sodium hydroxide solution (8 wt %) was added dropwise to the reaction mixture, and the reaction mixture was adjusted to pH 4.0. After 2 to 3 minutes from the start of dropwise addition of the sodium hydroxide solution, the reaction mixture started to become cloudy. After the reaction mixture reached pH 4.0, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1 μm). The filtration residue was then lightly washed with water, and dried at 50° C. in vacuo for two weeks. As a result, 23.59 g of a disilver hydrogen citrate-containing composition in powder form was obtained. This obtained powder was treated in the same manner as in Example 2-1. As a result of the analysis, the silver concentration thereof was 50.4 wt % in the powder of the disilver hydrogen citrate-containing composition. The silver concentration of this disilver hydrogen citrate-containing composition is in the range of 36.1 wt % to 53.2 wt %, and this accordingly indicates that the sample of Example 2-2 is also a composition composed of silver dihydrogen citrate and disilver hydrogen citrate. The mole ratio was calculated in the same manner as in Example 2-1, and thus the mole ratio of silver dihydrogen citrate to disilver hydrogen citrate in this disilver hydrogen citrate-containing composition was 0.21 to 0.79.

Example 2-3: Production of Disilver Hydrogen Citrate-Containing Composition Reusing Reaction Mother Liquor (pH 3.6)

To 1.25 L of the reaction mother liquor which is filtrate obtained in Example 2-2 through solid-liquid separation by suction filtration, 20.8 g (0.10 mol) of citric acid (monohydrate) and 16.8 g (0.1 mol) of silver nitrate were precisely weighed and added with stirring. Thereafter, similarly to Example 2-1, to the reaction mixture in which the added chemicals were completely dissolved to become completely clear, a sodium hydroxide solution (8 wt %) was added dropwise to the reaction mixture, and the reaction mixture was adjusted to pH 3.6. After 2 to 3 minutes from the start of dropwise addition of the sodium hydroxide solution, the reaction mixture started to become cloudy. After the reaction mixture reached pH 3.6, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1 μm). The filtration residue was then lightly washed with water, and dried at 50° C. in vacuo for two weeks. As a result, 23.95 g of a disilver hydrogen citrate-containing composition in powder form was obtained. This obtained powder was treated in the same manner as in Example 2-1. As a result of the analysis, the silver concentration thereof was 46.6 wt % in the powder of the disilver hydrogen citrate-containing composition. The silver concentration is in the range of 36.1 wt % to 53.2 wt %, and this accordingly indicates that the sample of Example 2-3 is also a composition composed of silver dihydrogen citrate and disilver hydrogen citrate. The mole ratio was calculated according to Example 2-1, and thus the mole ratio of silver dihydrogen citrate to disilver hydrogen citrate in this disilver hydrogen citrate-containing composition was 0.46 to 0.54.

Example 2-4: Production of Disilver Hydrogen Citrate-Containing Composition Using Twice the Amount of Raw Material and Reusing Reaction Mother Liquor (pH 4.0)

To 1.41 L of the reaction mother liquor which is filtrate obtained in Example 2-3 through solid-liquid separation by suction filtration, 42.0 g (0.20 mol) of citric acid (monohydrate) and 34.0 g (0.20 mol) of silver nitrate were precisely weighed and added with stirring. Thereafter, similarly to Example 2-1, To the reaction mixture in which the added chemicals were completely dissolved to become completely clear, a sodium hydroxide solution (8 wt %) was added dropwise to the reaction mixture, and the reaction mixture was adjusted to pH 4.0. After 2 to 3 minutes from the start of dropwise addition of the sodium hydroxide solution, the reaction mixture started to become cloudy. After the reaction mixture reached pH 4.0, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1 μm). The filtration residue was then lightly washed with water, and dried at 50° C. in vacuo for two weeks. As a result, 45.49 g of a disilver hydrogen citrate-containing composition in powder form was obtained. This obtained powder was treated in the same manner as in Example 2-1. As a result of the analysis, the silver concentration thereof was 49.8 wt % in the powder of the disilver hydrogen citrate-containing composition. The silver concentration is in the range of 36.1 wt % to 53.2 wt %, and this accordingly indicates that the sample of Example 2-4 is also a composition composed of silver dihydrogen citrate and disilver hydrogen citrate. The mole ratio was calculated according to Example 2-1, and thus the mole ratio of silver dihydrogen citrate to disilver hydrogen citrate in this disilver hydrogen citrate-containing composition was 0.25 to 0.75.

Example 2-5: Production of Disilver Hydrogen Citrate-Containing Composition Using Twice the Amount of Raw Material and Reusing Reaction Mother Liquor (pH 4.5)

To 1.68 L of the reaction mother liquor which is filtrate obtained in Example 2-4 through solid-liquid separation by suction filtration, 42.0 g (0.20 mol) of citric acid (monohydrate) and 34.0 g (0.20 mol) of silver nitrate were precisely weighed and added with stirring. Thereafter, similarly to Example 2-1, to the reaction mixture in which the added chemicals were completely dissolved to become completely clear, a sodium hydroxide solution (8 wt %) was added dropwise to the reaction mixture, and the reaction mixture was adjusted to pH 4.0. After 2 to 3 minutes from the start of dropwise addition of the sodium hydroxide solution, the reaction mixture started to become cloudy. After the reaction mixture reached pH 4.5, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1

μm). The filtration residue was then lightly washed with water, and dried at 50° C. in vacuo for two weeks. As a result, 45.49 g of a disilver hydrogen citrate-containing composition in powder form was obtained. This obtained powder was treated in the same manner as in Example 2-1. As a result of the analysis, the silver concentration was 49.8 wt % in the powder of the disilver hydrogen citrate-containing composition. The silver concentration is in the range of 36.1 wt % to 53.2 wt %, and this accordingly indicates that the sample of Example 2-5 is also a composition composed of silver dihydrogen citrate and disilver hydrogen citrate. The mole ratio was calculated according to Example 2-1, and thus the mole ratio of silver dihydrogen citrate to disilver hydrogen citrate in this disilver hydrogen citrate-containing composition was 0.25 to 0.75.

Example 2-6: Production of Disilver Hydrogen Citrate-Containing Composition Using Twice the Amount of Raw Material and Reusing Reaction Mother Liquor (pH 2.5)

To 1.87 L of the reaction mother liquor which is filtrate obtained in Example 2-5 through solid-liquid separation by suction filtration, 42.0 g (0.20 mol) of citric acid (monohydrate) and 34.0 g (0.20 mol) of silver nitrate were precisely weighed and added with stirring. Thereafter, similarly to Example 2-1, to the reaction mixture in which the added chemicals were completely dissolved to become completely clear, a sodium hydroxide solution (8 wt %) was added dropwise to the reaction mixture, and the reaction mixture was adjusted to pH 2.5. After 2 to 3 minutes from the start of dropwise addition of the sodium hydroxide solution, the reaction mixture started to become cloudy. After the reaction mixture reached pH 2.5, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1 μm). The filtration residue was then lightly washed with water, and dried at 50° C. in vacuo for two weeks. As a result, 44.27 g of a disilver hydrogen citrate-containing composition in powder form was obtained. This obtained powder was treated in the same manner as in Example 2-1, and the analysis result of the silver concentration thereof was 39.7 wt % in the powder of the disilver hydrogen citrate-containing composition. The silver concentration is in the range of 36.1 wt % to 53.2 wt %, and this accordingly indicates that the sample of Example 2-6 is also a composition composed of silver dihydrogen citrate and disilver hydrogen citrate. The mole ratio was calculated according to Example 2-1, and thus the mole ratio of silver dihydrogen citrate to disilver hydrogen citrate in this disilver hydrogen citrate-containing composition was 0.84 to 0.16.

Example 2-7: Production of Disilver Hydrogen Citrate-Containing Composition Using Twice the Amount of Raw Material and Reusing Reaction Mother Liquor (pH 2.0)

To 2.10 L of the reaction mother liquor which is filtrate obtained in Example 2-6 through solid-liquid separation by suction filtration, 42.0 g (0.20 mol) of citric acid (monohydrate) and 34.0 g (0.20 mol) of silver nitrate were precisely weighed and added with stirring. Thereafter, similarly to Example 2-1, to the reaction mixture in which the added chemicals were completely dissolved to become completely clear, a sodium hydroxide solution (8 wt %) was added dropwise to the reaction mixture, and the reaction mixture was adjusted to pH 2.0. After 2 to 3 minutes from the start of dropwise addition of the sodium hydroxide solution, the reaction mixture started to become cloudy. After the reaction mixture reached pH 2.0, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1 μm). The filtration residue was then lightly washed with water, and dried at 50° C. in vacuo for two weeks. As a result, 26.33 g of a disilver hydrogen citrate-containing composition in powder form was obtained. This obtained powder was treated in the same manner as in Example 2-1, and the analysis result of the silver concentration thereof was 37.2 wt % in the powder of the disilver hydrogen citrate-containing composition. The silver concentration is in the range of 36.1 wt % to 53.2 wt %, and this accordingly indicates that the sample of Example 2-7 is also a composition composed of silver dihydrogen citrate and disilver hydrogen citrate. The mole ratio was calculated according to Example 2-1, and thus the mole ratio of silver dihydrogen citrate to disilver hydrogen citrate in this disilver hydrogen citrate-containing composition was 0.95 to 0.05.

Example 2-8: Production of Disilver Hydrogen Citrate-Containing Composition Using Twice the Amount of Raw Material and Reusing Reaction Mother Liquor (pH 5.5)

To 2.72 L of the reaction mother liquor which is filtrate obtained in Comparative Example 1 through solid-liquid separation by suction filtration, 42.0 g (0.20 mol) of citric acid (monohydrate) and 34.0 g (0.20 mol) of silver nitrate were precisely weighed and added with stirring. Thereafter, similarly to Example 2-1, to the reaction mixture in which the added chemicals were completely dissolved to become completely clear, a sodium hydroxide solution (8 wt %) was added dropwise to the reaction mixture, and the reaction mixture was adjusted to pH 5.5. After 2 to 3 minutes from the start of dropwise addition of the sodium hydroxide solution, the reaction mixture started to become cloudy. After the reaction mixture reached pH 5.5, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1 μm). Solid-liquid separation was not able to be easily performed as in the case of the precipitate of disilver hydrogen citrate-containing composition precipitated in a low pH range. The obtained silver citrate was dried at 50° C. in vacuo for two weeks, and 37.59 g of a disilver hydrogen citrate-containing composition in powder form was obtained. This obtained powder was treated in the same manner as in Example 2-1, and the analysis result of the silver concentration thereof was 57.9 wt % in the powder of the disilver hydrogen citrate-containing composition. This means that the silver concentration in the disilver hydrogen citrate-containing composition is thus in the range of 53.2 wt % to 63.1 wt %, suggesting that the sample in Example 2-8 is a composition composed of silver dihydrogen citrate and trisilver citrate by the above-described calculation method. As a result of the mole ratio in this exemplified calculation method, the mole ratio of silver dihydrogen citrate to disilver hydrogen citrate in this disilver hydrogen citrate-containing composition was 0.58 to 0.42.

Example 2-9: Production of Disilver Hydrogen Citrate-Containing Composition Using Twice the Amount of Raw Material and Reusing Reaction Mother Liquor (pH 5.0)

To 3.12 L of the reaction mother liquor which is filtrate obtained in Example 2-8 through solid-liquid separation by suction filtration, 42.0 g (0.20 mol) of citric acid (monohydrate) and 34.0 g (0.20 mol) of silver nitrate were precisely weighed and added with stirring. Thereafter, similarly to Example 2-1, to the reaction mixture in which the added chemicals were completely dissolved to become completely clear, a sodium hydroxide solution (8 wt %) was added dropwise to the reaction mixture, and the reaction mixture was adjusted to pH 5.0. After 2 to 3 minutes from the start of dropwise addition of the sodium hydroxide solution, the reaction mixture started to become cloudy. After the reaction mixture reached pH 5.0, stirring was further continued for three hours to accelerate the reaction. In this way, a supersaturated aqueous solution in which silver dihydrogen citrate and trisilver citrate are precipitated was prepared. Thereafter, stirring was stopped, and the entire reaction mixture was subjected to solid-liquid separation by suction filtration using No. 5C standard filter paper (pore size: 1 μm). The obtained disilver hydrogen citrate-containing composition was dried at 50° C. in vacuo for two weeks, and 37.15 g of a disilver hydrogen citrate-containing composition in powder form was obtained. This obtained powder was treated in the same manner as in Example 2-1. As a result of the analysis, the silver concentration thereof was 57.0 wt % in the disilver hydrogen citrate-containing composition powder. The silver concentration is in the range of 53.2 wt % to 63.1 wt %, and this accordingly indicates that the sample of Example 2-9 is a composition composed of disilver hydrogen citrate and trisilver citrate. When the mole ratio was calculated according to Example 2-8, and thus the mole ratio of silver dihydrogen citrate to disilver hydrogen citrate in this disilver hydrogen citrate-containing composition was 0.68 to 0.32.

The preparation results of the disilver hydrogen citrate-containing compositions of Examples 2-1 to 2-9 are listed in Table 6.

TABLE 6

| Exp. No. | Final pH of Mother Liquor [—] | Final Silver Concentration of Mother Liquor [mg/L] | Mother Liquor Value [L] | Added Silver Nitrate, Weight [g] | Added Citric Acid (Monohydrate), Weight [g] | Silver Citrate Mixture (dried at 40° C.) [g] | Silver Concentration in Silver Citrate Mixture [wt %] | Weight Ratio of silver Dihydrogen Citrate [wt %] |
|---|---|---|---|---|---|---|---|---|
| Example 2-1 | 4.0 | 1990 | 1.12 | 17.0 | 20.8 | 18.95 | 49.5 | 21.7 |
| Example 2-2 | 4.0 | 1700 | 1.25 | 17.0 | 20.8 | 23.59 | 59.4 | 16.8 |
| Example 2-3 | 3.6 | 2090 | 1.41 | 16.8 | 20.8 | 23.95 | 46.6 | 38.4 |
| Example 2-4 | 1.0 | 1420 | 1.68 | 34.0 | 42.0 | 45.49 | 49.8 | 19.8 |
| Example 2-5 | 4.5 | 1440 | 1.87 | 34.0 | 45.5 | 45.53 | 52.8 | 2.6 |
| Example 2-6 | 2.5 | 1600 | 2.10 | 34.0 | 42.0 | 44.27 | 39.7 | 79.1 |
| Example 2-7 | 2.0 | 10500 | 2.31 | 34.0 | 42.0 | 26.33 | 37.2 | 93.6 |
| Example 2-8 | 5.5 | 850 | 3.12 | 34.0 | 42.0 | 37.59 | 57.9 | — |
| Example 2-9 | 5.0 | 870 | 3.52 | 34.0 | 42.0 | 37.15 | 57.0 | |

| Exp. No. | Weight Ratio of Disilver Hydrogen Citrate [wt %] | Weight Ratio of Trisilver Citrate [wt %] | Mole Ratio of Silver Dihydrogen Citrate [—] | Mole Ratio of Disilver Hydrogen Citrate [—] | Mole Ratio of Trisilver Citrate [—] |
|---|---|---|---|---|---|
| Example 2-1 | 78.3 | | 0.27 | 0.73 | |
| Example 2-2 | 83.4 | — | 0.21 | 0.79 | — |
| Example 2-3 | 61.6 | | 0.46 | 0.54 | |
| Example 2-4 | 80.2 | | 0.25 | 0.75 | |
| Example 2-5 | 97.4 | — | 0.03 | 0.97 | — |
| Example 2-6 | 20.9 | — | 0.84 | 0.16 | — |
| Example 2-7 | 6.4 | | 0.95 | 0.05 | |
| Example 2-8 | 52.7 | 47.3 | — | 0.58 | 0.42 |
| Example 2-9 | 62.5 | 37.5 | — | 0.68 | 0.32 |

Comparative Example 2-1: Production of Disilver Hydrogen Citrate-Containing Composition in (pH 7.5)

To 1.20 L of the reaction mother liquor which is filtrate obtained in Example 2-7 through solid-liquid separation by suction filtration, 42.0 g (0.20 mol) of citric acid (monohydrate) and 34.0 g (0.20 mol) of silver nitrate were precisely weighed and added with stirring. Thereafter, similarly to Example 2-1, to the reaction mixture in which the added chemicals were completely dissolved to become completely clear, a sodium hydroxide solution (8 wt %) was added dropwise to the reaction mixture, and the reaction mixture was adjusted to pH 7.5. After 2 to 3 minutes from the start of dropwise addition of the sodium hydroxide solution, the reaction mixture started to become cloudy. After the reaction mixture reached pH 7.5, stirring was further continued for three hours to accelerate the reaction. In this way, a supersaturated aqueous solution in which the disilver hydrogen citrate-containing composition is precipitated was prepared. Thereafter, stirring was stopped, and the entire reaction mixture was subjected to solid-liquid separation by suction filtration using No. 5C standard filter paper (pore size: 1 μm). However, after several minutes, the filter paper was clogged, and thus solid-liquid separation was not possible. Then, the entire reaction mixture was put into a container again and left to stand for one day and night. Since the precipitate completely settled on the bottom the next day, the supernatant (mother liquor) was taken out to another container, 1.0 L of ion-exchanged water was added thereto, and the mixture was stirred whereby the sediment was re-dispersed, and the mixture was left to stand for one day and night. Thereafter, the disilver hydrogen citrate-containing composition obtained by decantation was dried at 50° C. in vacuo for two weeks, and 65.83 g of a disilver hydrogen citrate-containing composition in powder form was obtained. This obtained powder was treated in the same manner as in Example 2-1. As a result of the analysis, the silver concentration thereof was 62.2 wt % in the disilver hydrogen citrate-containing composition. The silver concentration is in the range of 53.2 wt % to 63.1 wt %, and this accordingly indicates that the sample is a composition composed of disilver hydrogen citrate and trisilver citrate. The mole ratio was calculated according to the above-described calculation method, and thus the mole ratio of silver dihydrogen citrate to trisilver citrate in this disilver hydrogen citrate-containing composition was 0.13 to 0.87. The results are listed in Table 7.

Comparative Example 2-2: Production of Disilver Hydrogen Citrate-Containing Composition. Production in (pH 1.8)

To 3.52 L of the reaction mother liquor which is filtrate obtained in Example 2-9 through solid-liquid separation by suction filtration, 42.0 g (0.20 mol) of citric acid (monohydrate) and 34.0 g (0.20 mol) of silver nitrate were precisely weighed and added with stirring. The pH of the reaction mixture was pH 1.4. Next, a sodium hydroxide solution (8 wt %) was added dropwise to the reaction mixture, and the reaction mixture was adjusted to pH 1.8. In this case, the reaction mixture was transparent, and no precipitate of the disilver hydrogen citrate-containing composition was formed. The results are listed in Table 7.

Next, the pH values and the mole ratio of disilver hydrogen citrate/trisilver citrate described above in Tables 6 and 7 were plotted as shown in FIG. 4.

Example 2-10: Production and Evaluation of Antibacterial Agent or Antiviral Agent

[Bactericidal Effect of Disilver Hydrogen Citrate-Containing Composition]

In 100 mL of a citric acid solution (6.0 wt %), 0.505 g of the powder of the disilver hydrogen citrate-containing composition composed of disilver hydrogen citrate and silver dihydrogen citrate obtained in Example 2-1 was added to and dissolved, and a solution used as an antibacterial agent and an antiviral agent was obtained. The silver ion concentration in the obtained solution, measured using a high frequency inductively coupled plasma (ICP) emission spectroscopy ("ICP S-8100" manufactured by SHIMADZU CORPORATION), was 2480 ppm.

Using the obtained antibacterial agent or antiviral agent, the antibacterial performance was evaluated by measuring the minimum inhibitory concentration (MIC) of silver ions against various bacteria according to the agar dilution method, which is a standard method specified by the Japanese Society of Chemotherapy. Specifically, each of test bacteria was cultured in Mueller-Hinton Broth (MHB) medium (30.0% meat extract (w/v), 1.75% casamino acid (w/v), 0.15% soluble starch (w/v), pH 7.3±0.1), and a bacterial suspension for inoculation was prepared so that the number of a test bacteria was $1.0\times10^4$ to $5.0\times10^4$ CFU/mL. Based on a sample obtained by diluting the above-described test solution with MHB medium to 10 times (silver ion concentration: 248 ppm), a two-fold dilution series was prepared up to a silver ion concentration of 0.5 ppm. Each sample was cultured with shaking for 24 hours under conditions of 100 to 200 rpm (horizontal shaking), an amplitude of 40 to 60 mm, and 35 to 37° C. so as to be uniformly mixed. The results are listed in Table 8.

From the results of this test, it can be seen that an antibacterial agent or an antiviral agent using the powder of such a novel disilver hydrogen citrate-containing composition of the present invention exhibits an antibacterial effect on gram-negative bacteria, gram-positive bacteria, yeast, and fungi, as an antibacterial agent having a wide antibacterial spectrum.

TABLE 7

| Exp. No. | Final pH of Mother Liquor | Final Silver Concentration of Mother Liquor | Mother Liquor Value | Added Silver Nitrate, Weight | Added Citric Acid (Monohydrate), Weight | Silver Citrate Mixture (dried at 40° C.) | Silver Concentration in Silver Citrate Mixture | Weight Ratio of silver Dihydrogen Citrate |
|---|---|---|---|---|---|---|---|---|
| Comparative Example 2-1 | 7.5 | 240 | 2.72 | 34.0 | 42.0 | 65.83 | 62.2 | — |
| Comparative Example 2-2 | 1.8 | — | 3.92 | 34.0 | 42.0 | — | — | — |

| Exp. No. | Weight Ratio of Disilver Hydrogen Citrate | Weight Ratio of Trisilver Citrate | Mole Ratio of Silver Dihydrogen Citrate | Mole Ratio of Disilver Hydrogen Citrate | Mole Ratio of Trisilver Citrate |
|---|---|---|---|---|---|
| Comparative Example 2-1 | 10.5 | 89.5 | — | 0.13 | 0.87 |
| Comparative Example 2-2 | — | — | — | — | — |

Next, the pH values and the mole ratio of silver dihydrogen citrate/disilver hydrogen citrate described above in Table 6 were plotted as shown in FIG. 3.

Minimum Inhibitory Concentration of Disilver Hydrogen Citrate-Containing Composition

TABLE 8

| Bacterial species | Antibacterial Solution vol % | MIC Silver Concentration(ppm) |
|---|---|---|
| *Escherichia coli* | 0.08 | 2 |
| *Staphylococcus aureus* | 0.16 | 4 |
| *Pseudomonas aeruginosa* | 0.08 | 2 |
| *Klebsiella pneumoniae* | 0.08 | 2 |
| *Bacillus subtilis* | 0.16 | 4 |
| *Candida albicans* | 0.16 | 4 |
| *Trichophyton mentagrophytes* | 0.16 | 4 |
| *Aspergillus niger* | 1.3 | 32 |

[Effects on Viruses]

All the following tests were performed under the conditions of 25° C., and an influenza A virus (H3N2) and feline coronavirus were used as test viruses, and Madin-Darby Canine Kidney cells (MDCK cells) were used as host cells.

(1) Antiviral Test Against Influenza a Virus

An antiviral test was performed using the disilver hydrogen citrate-containing composition solution in Example 2-10 (silver concentration: 2480 ppm). An antiviral test solution (silver: 50 ppm) having a silver concentration of 50 ppm solution was prepared by adding 10.0 ml of the stock solution to 490 ml of ion-exchanged water to dilute the stock solution to 50 times. Here, a silver concentration of the antiviral test solution was set to 50 ppm because the range of 10 to 100 ppm in a silver concentration products are generally used for studying for practical use of products. To 9 mL of this antiviral test solution, 1.0 mL of a virus suspension of $1.6\times10^8$ PFU/mL was added, and the mixture was left to stand at 25° C. for 5 minutes or 10 minutes to obtain test solutions. After standing, 0.5 mL of the test solution was added to 4.5 mL of a activation inhibitor (0.85% saline containing 0.05% Tween80) to mix themselves, and thus the action of the antiviral agent against the virus was stopped. Using the resulted surviving virus, the virus infectivity titer was evaluated by a plaque method. The number of surviving viruses was reduced to no more than 100, that is, to a one hundred-millionth in the case of standing for 5 minutes. The same was observed in the case of standing for 10 minutes.

As a result, it was found that the agent has practically sufficient virus inactivation performance against influenza viruses. There are various kinds of influenza viruses such as pathogenic influenza (H1N5) and avian influenza whose spike properties are different from that of the influenza A virus (H3N2). It is imagined that silver ions adsorb to these spikes and lose their functions, suggesting that various kinds of influenza viruses including mutated influenza viruses can be inactivated. The results are listed in Table 9.

(2) Host Cell Validation Test (2-1) Cytotoxicity Test

Whether the agent having a virus inactivation function is safe also for humans is determined. To 4.5 mL of the activation inhibitor, 0.5 mL of the above antiviral test solution is added, and the resulting solution was mixed. The cells were stained in the same manner as in the plaque measurement method, and the presence or absence of cytotoxicity was determined. Phosphate buffered saline was used as a control. It was found from these test results that the sample of the agent is a safe agent exhibiting no toxicity to Madin-Darby canine kidney cells as with the physiological saline. This is listed in Table 10.

(2-2) Verification of Cell Sensitivity to Virus

Whether the virus used in these tests maintained proper sensitivity in the specified test method was determined. To 9 mL of the activation inhibitor, 1.0 mL of the above antiviral solution was added, and the resulting solution was mixed, and 5 mL of the mixed liquid was collected and transferred to a test tube. Here, an influenza A virus (H3N2) suspension ($4\times10^4$ to $6\times10^4$ PFU/mL) was prepared, and 0.05 mL of this suspension was added to the above test tube. After standing at 25° C. for 30 minutes, the virus infectivity titer was measured by a plaque method, whereby it was determined that no deterioration occurs in cell sensitivity to the virus. Phosphate buffered saline was used as a control. The viruses used had sufficient activity and no deterioration in sensitivity was seen.

From these results, it was further determined that the agent is highly safe and has a sufficient inactivation effect on viruses. The results are listed in Table 10.

From the above test results as well, the antibacterial liquid using the disilver hydrogen citrate-containing composition of the present invention had a wide antibacterial spectrum, and further had a strong antibacterial effect on gram-negative bacteria such as *Escherichia coli, Pseudomonas aeruginosa*, and *Klebsiella pneumoniae*. Further, the antibacterial liquid had an antibacterial effect similarly on gram-positive bacteria such as *Staphylococcus aureus* and *Bacillus subtilis*, pathogenic yeasts such as *Candida albicans*, and fungi such as *Trichophyton mentagrophytes* and *Aspergillus niger*. Furthermore, from Tables 8 to 10, the antiviral solution of the present invention had no cytotoxicity, and exhibited a remarkable inactivation effect on viruses such as influenza viruses.

TABLE 9

| Test Sample | | Virus Infectivity Titer (PFU/mL) (Common Logarithm Average) |
|---|---|---|
| Antiviral Solution(Silver Concentration: 50 ppm) | Standing for 5 min. | <2.00 |
| | Standing for 10 min. | <2.00 |
| PBS (Phosphate Buffered Saline) | Immediately after mixing | 7.50 |
| | Standing for 5 min. | 7.45 |
| | Standing for 10 min. | 7.43 |

TABLE 10

| Test Sample | Presence or Absence of Cytotoxicity | Verification of Cell Sensitivity to Virus Virus Infectivity Titer (PFU/mL) (Common Logarithm Average) |
|---|---|---|
| Antiviral Solution(Silver Concentration: 30 ppm) | None | 2.58 |
| PBS (Phosphate Buffered Saline) | None | 2.56 |

(2) Antiviral Test Against Feline Coronavirus (Feline Infectious Peritonitis Virus ATCC VR-2127)

The coronavirus and the above-described influenza virus have different protein constitutions (envelopes) on their surfaces. Some antiviral drugs may exhibit an effect in the former but not in the latter. In general, there are few drugs that can exhibit a sufficient antiviral effect on a coronavirus. Here, an antiviral test was performed using the disilver hydrogen citrate-containing composition solution in Example 2-10 (silver concentration: 2480 ppm). An antiviral test solution (silver: 100 ppm) having a silver concentration of 100 ppm solution was prepared by adding 20.2 ml of this stock solution to 480 ml of ion-exchanged water to dilute the stock solution 24.8 times. Here, a silver concentration of the antiviral test solution was set to 100 ppm because the range of 10 to 100 ppm in a silver concentration products are generally used for studying for practical use of products. To 9 mL of this antiviral test solution, 1.0 mL of a virus suspension of $1.6\times10^{8}$ PFU/mL was added, and the mixture was left to stand at 25° C. for 30 minutes or 60 minutes to obtain test solutions. After standing, 0.5 mL of the test solution was added to 4.5 mL of a activation inhibitor (0.85% saline containing 0.05% Tween80) to mix themselves, and thus the reaction of the antiviral agent with the virus was stopped. Using the resulted surviving virus, the virus infectivity titer was evaluated by a plaque method. The number of surviving virus is reduced to 350 (PFU/mL), that is, one five-thousandth relative to 1.8 million (PFU/mL) of the control sample in the case of standing for 30 minutes. The virus is completely inactivated (below the detection limit) in the case of standing for 60 minutes. Although not able to be tested with pathogenic coronavirus COVID-19, it was tested with feline coronavirus which is structurally similar thereto. It was found that the agent has practically sufficient virus inactivation performance. The results are listed in Table 11.

(2) Host Cell Validation Test (2-1) Cytotoxicity Confirmation Test

Whether the agent having a virus inactivation ability is safe for humans is determined. To 4.5 mL of the activation inhibitor, 0.5 mL of the above antiviral test solution is added and, the resulting solution was mixed. The cells were stained in the same manner as in the plaque measurement method, and the presence or absence of cytotoxicity was determined. Phosphate buffered saline was used as a control. It was found from these test results that the sample of the agent is a safe agent exhibiting no toxicity to Madin-Darby canine kidney cells as with the physiological saline. This is listed in Table 12.

(2-2) Verification of Cell Sensitivity to Virus

Whether the virus used in these tests maintained proper sensitivity in the specified test method was determined. To 9 mL of the activation inhibitor, 1.0 mL of the above antiviral solution was added, and the resulting solution was mixed, and 5 mL of the mixed liquid was collected and transferred to a test tube. Here, a feline coronavirus suspension ($4\times10^{4}$ to $6\times10^{4}$ PFU/mL) was prepared, and 0.05 mL of this suspension was added to the above test tube. After standing at 25° C. for 30 minutes, the virus infectivity titer was measured by a plaque method, whereby deterioration on cell sensitivity to the virus was observed. Phosphate buffered saline was used as a control. The viruses used had sufficient activity and no deterioration in sensitivity was seen. As a result, it was found that the agent is highly safe and has a sufficient inactivation action on viruses. The results are listed in Table 12.

TABLE 11

| Test Sample | | Virus Infectivity Titer (PFU/mL) (Common Logarithm Average) |
|---|---|---|
| Antiviral Solution(Silver Concentration: 100 ppm) | Standing for 30 minutes | 2.54 |
| | Standing for 60 minutes | <2.00 |
| PBS (Phosphate Buffered Saline) | Immediately after mixing | 6.24 |
| | Standing for 30 minutes | 6.14 |
| | Standing for 60 minutes | 6.14 |

TABLE 12

| Test Sample | | Verification of Cell Sensitivity to Virus Virus Infectivity Titer (PFU/mL) (Common Logarithm Average) |
|---|---|---|
| Antiviral Solution(Silver Concentration: 100 ppm) | None | 2.61 |
| PBS (Phosphate Buffered Saline) | None | 2.68 |

As shown in Table 8, the disilver hydrogen citrate-containing composition antibacterial liquid using the novel disilver hydrogen citrate-containing composition of the present invention had a wide antibacterial spectrum against various bacteria, and had a strong antibacterial effect particularly against gram-negative bacteria such as *Escherichia coli, Pseudomonas aeruginosa*, and *Klebsiella pneumoniae*. Further, it was found that the antibacterial liquid had an antibacterial effect similarly on gram-positive bacteria such as *Staphylococcus aureus* and *Bacillus subtilis*, pathogenic yeast such as *Candida albicans*, and fungi such as *Trichophyton mentagrophytes* and *Aspergillus niger*, and exhibits an effect as a useful antibacterial agent.

In addition, as shown in Tables 9 to 12, it was found that when this novel disilver hydrogen citrate-containing composition powder of the present invention was used as an antiviral agent, it does not have cytotoxicity, exhibits a remarkable inactivation effect on viral species such as influenza viruses and coronaviruses, and exhibits an effect as a useful antiviral agent. The agent is a practical antibacterial agent and antiviral agent.

<Analysis of Commercially Available Silver Dihydrogen Citrate Aqueous Solution>

The silver concentration of a commercially available silver dihydrogen citrate aqueous solution ("TINOSAN SDC" manufactured by Ciba Specialty Chemical Corporation) was measured by ICP analysis. The silver concentration was 2700 ppm. In addition, 50 ml of the sample was collected and dried at 40° C. in vacuo for two weeks, and a silver citrate powder in powder form was obtained. An attempt was made to determine the mole ratio of silver dihydrogen citrate to disilver hydrogen citrate in the obtained silver citrate powder, but the coexisting citric acid concentration is described as 6 wt %, and thus citric acid accounts for about 90 wt % in the dry powder. Therefore, the mole ratio of disilver hydrogen citrate to silver dihydrogen citrate was not able to be determined by the above calculation method herein.

Example 2-11: Production of Disilver Hydrogen Citrate-Containing Composition Using Disodium Hydrogen Citrate Solution as pH Adjuster At room temperature (25° C.), 20.8 g (0.10 mol) of citric acid monohydrate and 17.0 g (0.1 mol) of silver nitrate are precisely weighed and added into 1000 mL of ion-exchanged water, whereby a reaction mixture is obtained. To the reaction mixture in which the added chemicals were completely dissolved to become clear, a disodium hydrogen citrate aqueous solution (30 wt %) is added dropwise to the reaction mixture, and the reaction mixture that reached pH 1.6 is raised to a pH of 4.0. After the reaction mixture reaches pH 4.0, stirring is further continued for three hours. In this way, a supersaturated aqueous solution in which disilver hydrogen citrate-containing composition is precipitated is prepared. Thereafter, stirring is stopped, and the reaction mixture is subjected to solid-liquid separation by suction filtration using No. 5C standard filter paper (pore size: 1 μm), the filtration residue is then lightly washed with water and placed in a sealed dryer, and dried at 50° C. in vacuo for two weeks. As a result, a disilver hydrogen citrate-containing composition in powder form is obtained.

INDUSTRIAL APPLICABILITY

The method for producing a disilver hydrogen citrate-containing composition of the present invention can easily obtain a disilver hydrogen citrate-containing composition in powder form, having excellent solubility, with high efficiency. In addition, the production method of the present invention allows the production of a disilver hydrogen citrate-containing composition, even when trisilver citrate having poor workability is mixed with disilver hydrogen citrate, by filtering the mixed solution. The method is also extremely useful as an industrial production method.

The disilver hydrogen citrate-containing composition of the present invention can exhibit an antibacterial effect by silver ions derived from a silver compound, regardless of the change in the kind of bacteria and the presence or absence of acquisition of drug resistance of bacteria by antibiotics. In addition, when a target surface is coated with the antibacterial agent or the antiviral agent, prepared by diluting the powder of the disilver hydrogen citrate-containing composition of the present invention with water or a citric acid solution to a certain silver ion concentration, by application or other manner, and then is dried, the disilver hydrogen citrate-containing composition of the present invention remains on the trace at a uniform silver ion concentration and in the form of a film. Furthermore, even if the surface to be adhered is reapplied with alcohol or the like by re-disinfection, the disilver hydrogen citrate-containing composition remains after alcohol or the like is volatilized, and thus the effects of the antibacterial agent and the antiviral agent last indefinitely unless the surface to be adhered is washed off with water or the like.

Since the disilver hydrogen citrate-containing composition of the present invention has long-lasting properties and a wide antibacterial spectrum, and further has virus inactivation activity, it can be used as an antibacterial agent or an antiviral agent, and in the medical field as a composition of an antibacterial agent or an antiviral agent in any product form such as a medical bactericide as a pharmaceutical product; a wound covering agent; a burn covering agent; a decubitus covering agent; a gastric fistula, an intestinal fistula, a PEG, and the like; a catheter; an indwelling needle; gauze/bandage/dressing/plaster cast for covering an affected area. In addition, the disilver hydrogen citrate-containing composition of the present invention can be used as a composition of an antibacterial agent or an antiviral agent in any product form for preventing a secondary infection from an object that may be touched by a person, including: medical devices; office equipment; home electric appliances; lockers; in-hospital medical workers' clothes in general, masks, protective goggles, surgical caps, gloves, protective gowns, aprons, and the like; in-hospital sickbeds, blankets, sheets, blanket covers, pillows, pillow covers, partition curtains, and the like; patient rooms, intensive care units, consultation rooms, treatment rooms, examination rooms, physical therapy rooms, corridors, medical offices, pharmacies, secretariats, dining rooms, kitchens, bathrooms, restrooms, waiting rooms, and the like; and medical waste and laundry.

The disilver hydrogen citrate-containing composition of the present invention relates to, in the personal care field, disinfectants for face, head, hand, foot, whole body, hair, body hair, and skin; sanitary products for women; intimate care products; foot care products; oral care products such as toothpaste; dental froth products; sunscreens; after-sun care products; and lipstick products. In the field of cosmetics, the disilver hydrogen citrate-containing composition of the present invention relates to basic cosmetics, makeup, armpit deodorant, armpit antiperspirant, shampoo, rinse, conditioner, treatment, and cleansing agents. In the medical field, the disilver hydrogen citrate-containing composition of the present invention can be used as a composition of an antibacterial agent or an antiviral agent in any product form related to hair growth/density increasing agents, depilatory, bleaching agents, hair coloring agents, anti-acne agents, and disinfection of the inside of an oral cavity, an anus, a urethra, a vagina, or the like.

The disilver hydrogen citrate-containing composition of the present invention can be used in: all areas of activity of the military and the Self-Defense Force; all areas of activity of the police; all areas of activity of the Japan Coast Guard; all areas of activity of the fire/ambulance services; all areas of activity of kindergartens, nursery schools, childcare facilities, play games, playthings, schools, and dormitories, dining rooms, and the like thereof; and further in all articles that are touched by a person inside a home, a hospital, a nursing facility, a hotel, a hairdressing room, a barber shop, a restaurant, a sports gym, an office, a workplace, a factory/plant, a public facility, and a transportation means such as an airplane, a helicopter, a train, a bus, a monorail, a gondola, a ship, an automobile, and the like; and the inside of air conditioners, a filter, and the like.

More specifically, the disilver hydrogen citrate-containing composition of the present invention can be used for, for example, doors, furniture, fabric products, home electric appliances, switches, tableware, cooking utensils, cooking tables, sinks and the like, floor surfaces, wall surfaces, glass windows, bathtubs, toilet bowls, bedding, goods for infants and toddlers, playthings, equipment, devices, peripheral devices, tools, desks, desk peripheral devices, members inside automobiles, clothing, masks, protective goggles, gloves, caps, shoes, and aprons. The disilver hydrogen citrate-containing composition of the present invention can be used as a composition of an antibacterial agent or an antiviral agent for a product of a new functional agent in combination with a surface cleaning composition including detergent, soil suspender, fluorescent brightener, abrasive, or the like, or waxes or the like.

The disilver hydrogen citrate-containing composition of the present invention can be used in the field of food processing plants as a composition of an antibacterial agent or an antiviral agent in any product form for: hygiene maintenance management of machine parts, peripheral devices thereof, tools, the inside of air conditioners, filters and the like, processes regarding a food contact inner surface, the inside of food packaging materials, and the like; hygiene maintenance management of all work environments, clean environment preservation facilities, articles, surfaces, space, and the like; and hygiene maintenance management of all clothes, caps, masks, protective goggles, gloves, shoes, and the like, worn by workers.

The disilver hydrogen citrate-containing composition of the present invention can be used in the agricultural field as an antibacterial agent or antiviral agent in a product form including: a disease control agent in place of an antibiotic or an organic agricultural chemical used for protection from microbial contamination and keeping freshness of harvested fruits, vegetables, root vegetables, rhizomes, bulbs, fish and shellfish, and meat in general, and for controlling mold, bacteria, and viruses of cereals and the like; and a highly safe agricultural chemical or the like in place of an agricultural chemical or the like for fungus, bacteria, and viruses which cause soil-borne disease.

The disilver hydrogen citrate-containing composition of the present invention can be used in the livestock field as a composition of an antibacterial agent or an antiviral agent in product form for: hygiene maintenance management for articles in all processes in which meat is touched in a meat slaughtering/dressing process, surfaces, space and surfaces of meat itself, machine parts, peripheral devices thereof, the inside of air conditioners, filters, tools and the like, processes regarding a food contact inner surface, and the like; hygiene maintenance management of all work environments, clean environment preservation facilities, articles, surfaces, space, and the like; hygiene maintenance management of all clothes, caps, masks, protective goggles, gloves, shoes, worn by workers; and further, all animal drugs for livestock communicable disease (bovine dermatomycosis, dairy cattle breast inflammation, avian influenza, classical swine fever, or the like) caused by all mold, bacteria, and viruses.

The disilver hydrogen citrate-containing composition of the present invention can be used in an industrial field as a composition an antibacterial agent or an antiviral agent in any product form for: filters and cooling water of cooling towers, dryers, and compressors or the like; water pools; swimming pools; hot water systems; air conditioning systems; hot springs and mineral springs; water treatment equipment such as pipes, tanks, water treatment apparatuses, peripheral devices, pumps, and the like; or antiseptics, antifungal agents, antimicrobial agents, or the like. As described above, the antibacterial agent or the antiviral agent in the present invention can be used for various industrial uses.

As a using method in the modes of use of the disilver hydrogen citrate-containing composition of the present invention, using methods in any product form may be available, which includes: a product form in which a film is formed on the surface of any object by a method such as nebulizing, applying, spraying, immersion, or transferring; a product form in accordance with the using method conforming to its product shape of any liquid, solid, semi-solid, gel, sol, stick, or capsule shape; and a fiber itself having a sustained release effect or an emergency treatment effect in an emergency, or a product form of a composition containing the fiber in a bag shape, a container, a capsule, or the like.

In addition, when the powder of the novel disilver hydrogen citrate-containing composition of the present invention is used as a deodorant by dissolving in a citric acid solution, due to having an oxidizing power derived from silver, the disilver hydrogen citrate-containing composition can react with components such as a sulfur-based gas, an amine-based gas, an aldehyde-based gas, propionic acid, and isovaleric acid that cause malodor to be deodorized. Thus, the powder of the novel disilver hydrogen citrate-containing composition of the present invention can exhibit an effect as deodorant.

When this novel disilver hydrogen citrate-containing composition powder obtained by the production method of the present invention is used as an antiviral agent, the agent can exhibit an effect as a useful antiviral agent capable of inactivating, for example, a mutant virus strain such as the H5N1 subtype virus that is a cause of highly pathogenic avian influenza (HPAI) having an envelope similar to that of the influenza A virus (H3N2). In addition, although the virus responsible for severe acute respiratory syndrome (SARS) or the pathogenic coronavirus COVID-19 also has a protein structure of a spike different from that of influenza, it is still considered that inactivation can be similarly performed as long as it has an envelope sensitive to silver ions.

Therefore, the disilver hydrogen citrate-containing composition and the method of producing the same, as well as an antibacterial agent or an antiviral agent using the same and the method for producing the same of the present invention are industrially very useful.

The invention claimed is:

1. A composition, comprising disilver hydrogen citrate and silver dihydrogen citrate, or disilver hydrogen citrate and trisilver citrate, wherein the composition has 36.1 wt % or more and 63.1 wt % or less of a silver concentration.

2. A composition comprising disilver hydrogen citrate and silver dihydrogen citrate, wherein the composition has 36.1 wt % or more and 53.2 wt % or less of a silver concentration.

* * * * *